United States Patent
Kerley et al.

(10) Patent No.: US 9,238,911 B2
(45) Date of Patent: Jan. 19, 2016

(54) FLOOR-TO-CEILING PARTITION WALL ASSEMBLY

(71) Applicant: Steelcase, Inc., Grand Rapids, MI (US)

(72) Inventors: David Michael Kerley, Allegan, MI (US); Theodore M. Haan, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 138 days.

(21) Appl. No.: 14/028,993

(22) Filed: Sep. 17, 2013

(65) Prior Publication Data

US 2014/0075868 A1    Mar. 20, 2014

Related U.S. Application Data

(60) Provisional application No. 61/702,018, filed on Sep. 17, 2012, provisional application No. 61/702,008, filed on Sep. 17, 2012, provisional application No. 61/701,977, filed on Sep. 17, 2012, provisional application No. 61/701,969, filed on Sep. 17, 2012.

(51) Int. Cl.
*E04B 2/90* (2006.01)
*E04B 2/96* (2006.01)
(Continued)

(52) U.S. Cl.
CPC .................. *E04B 2/7453* (2013.01); *E04B 1/82* (2013.01); *E04B 2/00* (2013.01); *E04B 2/56* (2013.01); *E04B 2/72* (2013.01); *E04B 2/721* (2013.01); *E04B 2/74* (2013.01); *E04B 2/7457* (2013.01); *E04B 2/78* (2013.01); *E04H 1/06* (2013.01); *E05B 65/006* (2013.01); *E05C 1/06* (2013.01); *E05C 1/08* (2013.01); *E05D 15/0621* (2013.01);
(Continued)

(58) Field of Classification Search
CPC ......... E04F 13/07; E04F 13/072; E04F 13/08; E04F 13/0803; E04F 13/0875; E04B 2/885; E04B 2/90; E04B 2/96; E04B 2/965; E04B 2/967; E04B 2/7461; E04B 2/74; E04B 2/7412; E04B 2/72; E04B 2/56; E04B 2/00; E04B 1/82; E04B 2/721; E04B 2/78; E04B 2/765; E04B 2/7863; E04B 2/825; E04H 1/06; E06B 1/00
USPC ............. 52/242, 241, 238.1, 239, 243.1, 243, 52/300, 301, 465, 466, 468
See application file for complete search history.

(56) References Cited

U.S. PATENT DOCUMENTS

| 2,244,649 | A |   | 6/1941 | Carpenter et al. |       |
|-----------|---|---|--------|------------------|-------|
| 3,204,375 | A | * | 9/1965 | Kotarski         | 52/94 |

(Continued)

FOREIGN PATENT DOCUMENTS

| CN | 2473243 | 1/2002 |
|----|---------|--------|
| DE | 2747611 | 5/1978 |

(Continued)

*Primary Examiner* — Phi A
(74) *Attorney, Agent, or Firm* — Price Heneveld LLP

(57) ABSTRACT

A panel wall system includes a frame assembly adapted to support a plurality of skin assemblies in a floor-to-ceiling relationship. The panel wall system including a frame assembly having a trim member disposed thereon. The trim member includes a channel having a hollow body portion and first and second open ends disposed about a hollow middle portion. Seal members are received in the first and second open ends to seal the channel of the trim member while leaving the middle portion accessible for coupling to components of the panel wall system.

14 Claims, 37 Drawing Sheets

(51) Int. Cl.

| | | |
|---|---|---|
| *E04B 2/74* | (2006.01) | |
| *E04B 2/78* | (2006.01) | |
| *E06B 3/46* | (2006.01) | |
| *E06B 1/00* | (2006.01) | |
| *E06B 1/52* | (2006.01) | |
| *E05C 1/08* | (2006.01) | |
| *E06B 3/36* | (2006.01) | |
| *E04B 2/72* | (2006.01) | |
| *E04B 1/82* | (2006.01) | |
| *E05B 65/00* | (2006.01) | |
| *E05C 1/06* | (2006.01) | |
| *E04B 2/00* | (2006.01) | |
| *E04B 2/56* | (2006.01) | |
| *E04H 1/06* | (2006.01) | |
| *E05D 15/06* | (2006.01) | |
| *E06B 3/32* | (2006.01) | |
| *E05B 15/00* | (2006.01) | |
| *E04B 2/76* | (2006.01) | |
| *H02G 3/12* | (2006.01) | |
| *H02G 3/38* | (2006.01) | |
| *E04B 2/82* | (2006.01) | |

(52) U.S. Cl.
CPC ... *E06B 1/00* (2013.01); *E06B 1/52* (2013.01); *E06B 3/36* (2013.01); *E06B 3/4654* (2013.01); *E04B 2/7412* (2013.01); *E04B 2/765* (2013.01); *E04B 2/766* (2013.01); *E04B 2/7863* (2013.01); *E04B 2/825* (2013.01); *E04B 2002/749* (2013.01); *E04B 2002/7462* (2013.01); *E04B 2002/7466* (2013.01); *E04B 2002/7474* (2013.01); *E04B 2002/7483* (2013.01); *E04B 2002/7487* (2013.01); *E04B 2002/7488* (2013.01); *E05B 15/0053* (2013.01); *E06B 3/32* (2013.01); *H02G 3/123* (2013.01); *H02G 3/388* (2013.01); *Y10T 292/096* (2015.04)

(56) References Cited

U.S. PATENT DOCUMENTS

| | | | |
|---|---|---|---|
| 3,388,521 A | 6/1968 | Tillisch et al. | |
| 3,537,217 A | 11/1970 | Lickliter et al. | |
| 3,557,499 A | 1/1971 | Dickie et al. | |
| 3,651,887 A | 3/1972 | Eckel | |
| 3,707,060 A | 12/1972 | Jansen, Jr. | |
| 3,831,328 A | 8/1974 | Mohr et al. | |
| 3,837,132 A | 9/1974 | Weller | |
| 3,861,101 A * | 1/1975 | Whisson | 52/238.1 |
| 3,971,182 A * | 7/1976 | Donahue et al. | 52/282.3 |
| 3,972,167 A | 8/1976 | Vogeli | |
| 4,037,380 A * | 7/1977 | Pollock | 52/475.1 |
| 4,103,463 A * | 8/1978 | Dixon | 52/126.4 |
| 4,107,893 A | 8/1978 | Rensch | |
| 4,200,171 A | 4/1980 | Seymour et al. | |
| 4,356,674 A | 11/1982 | Propst et al. | |
| 4,361,994 A * | 12/1982 | Carver | 52/238.1 |
| 4,446,663 A | 5/1984 | Stumpf et al. | |
| 4,703,598 A | 11/1987 | Wilson et al. | |
| 4,709,517 A | 12/1987 | Mitchell et al. | |
| 4,716,698 A * | 1/1988 | Wilson et al. | 52/239 |
| 4,798,035 A | 1/1989 | Mitchell et al. | |
| 4,890,426 A * | 1/1990 | Hickman et al. | 52/58 |
| 4,999,961 A * | 3/1991 | McNary | 52/287.1 |
| 5,009,043 A | 4/1991 | Kurrasch | |
| 5,035,298 A | 7/1991 | Noxon | |
| 5,086,597 A | 2/1992 | Kelley et al. | |
| 5,125,201 A * | 6/1992 | Pieters et al. | 52/238.1 |
| 5,140,792 A * | 8/1992 | Daw et al. | 52/238.1 |
| 5,217,771 A | 6/1993 | Schmanski et al. | |
| 5,263,297 A * | 11/1993 | Kim | 52/834 |
| 5,301,477 A * | 4/1994 | Rellinger et al. | 52/36.1 |
| 5,339,576 A * | 8/1994 | Fussler | 52/71 |
| 5,423,151 A * | 6/1995 | Caro et al. | 52/145 |
| 5,438,171 A | 8/1995 | Schmanski | |
| 5,521,338 A | 5/1996 | Shono et al. | |
| 5,642,593 A | 7/1997 | Shieh | |
| 5,875,596 A * | 3/1999 | Muller | 52/239 |
| 6,073,412 A | 6/2000 | Verch | |
| 6,196,352 B1 | 3/2001 | Goodchild | |
| 6,256,941 B1 | 7/2001 | Yu et al. | |
| 6,640,507 B1 | 11/2003 | Leconte | |
| 6,951,085 B2 * | 10/2005 | Hodges et al. | 52/220.7 |
| 7,234,566 B2 * | 6/2007 | Simmons | 187/408 |
| 7,451,572 B1 * | 11/2008 | Inzeo et al. | 52/60 |
| 7,513,082 B2 | 4/2009 | Johnson | |
| 7,574,833 B2 | 8/2009 | Stark | |
| 7,900,411 B2 | 3/2011 | Antonic | |
| 8,074,412 B1 | 12/2011 | Gogan et al. | |
| 8,136,630 B2 | 3/2012 | Schnitta | |
| 8,561,360 B2 * | 10/2013 | Corbin, Jr. | 52/144 |
| 2009/0229198 A1 | 9/2009 | Gill | |

FOREIGN PATENT DOCUMENTS

| | | |
|---|---|---|
| EP | 201104 | 11/1986 |
| FR | 2497252 | 7/1982 |
| FR | 2952948 | 5/2011 |
| JP | 10054095 | 2/1998 |
| JP | 2002061313 | 2/2002 |
| NL | 1024937 | 6/2005 |
| WO | 2010003815 | 1/2010 |

* cited by examiner

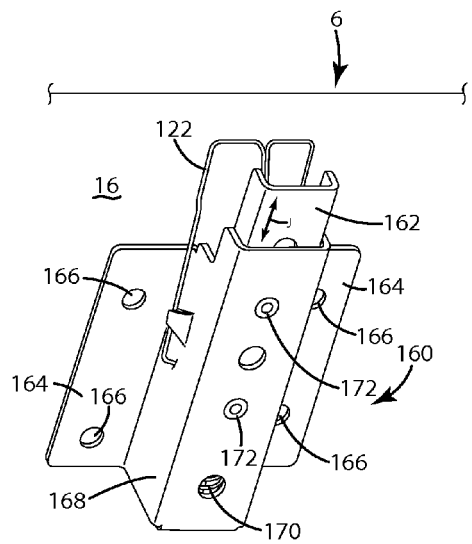
Fig. 20
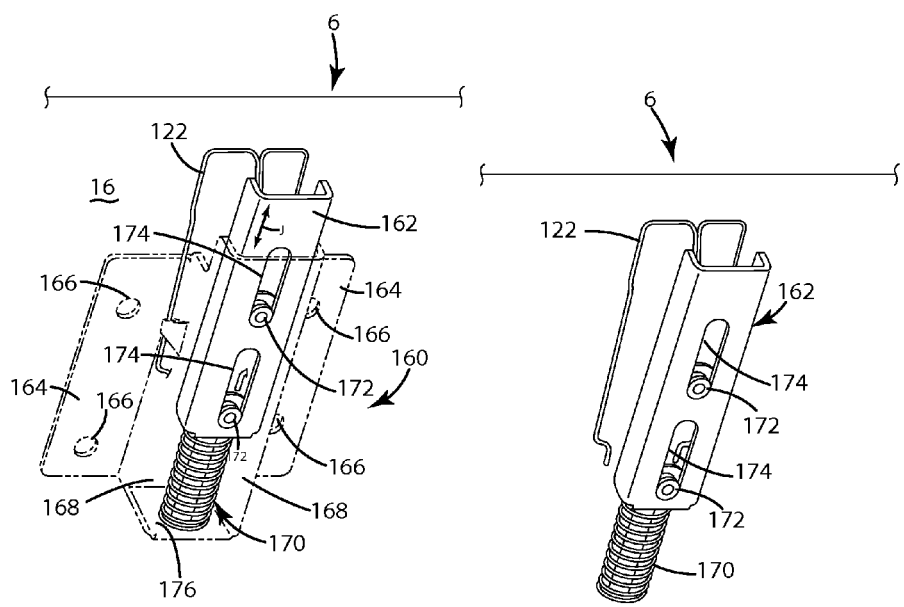
Fig. 21
Fig. 22

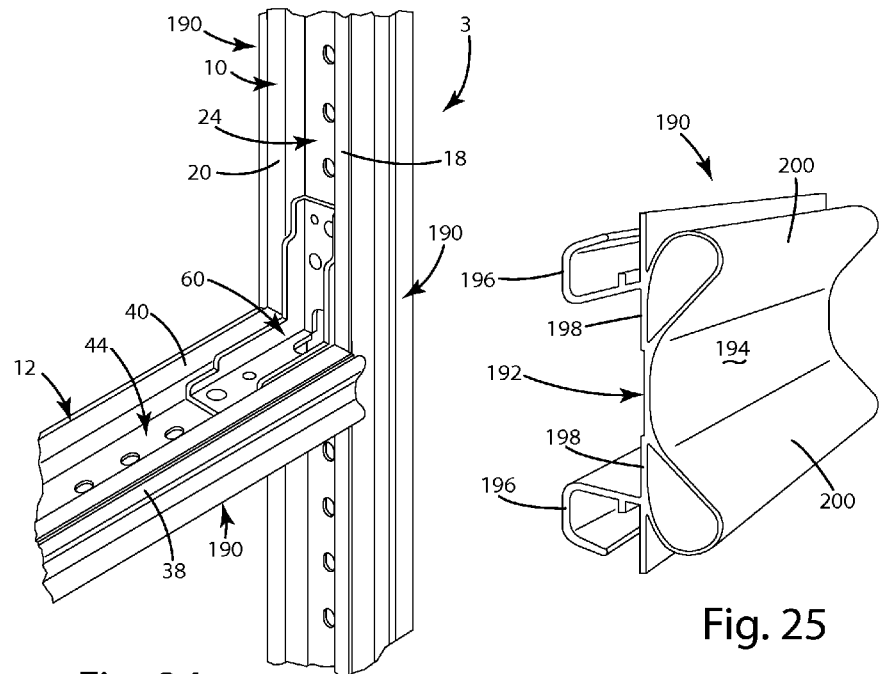
Fig. 24
Fig. 25
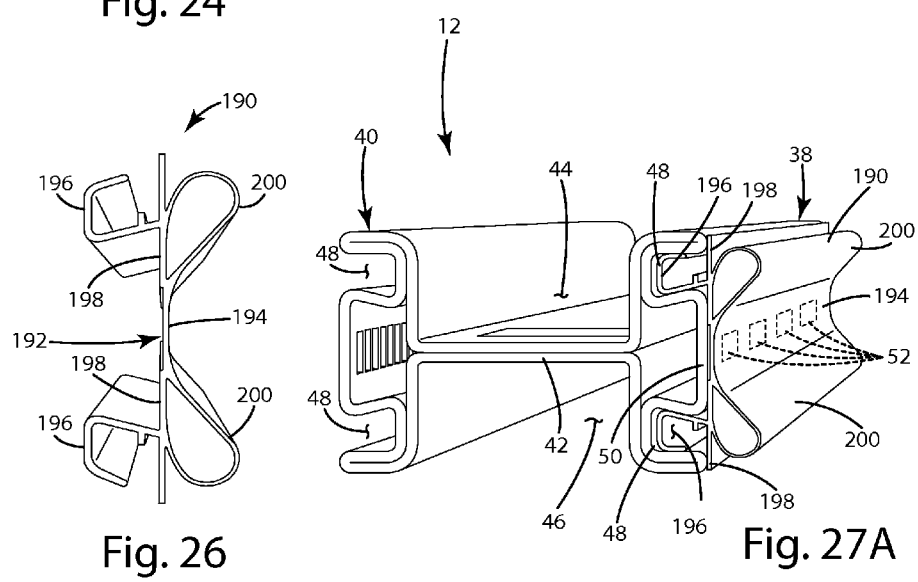
Fig. 26
Fig. 27A

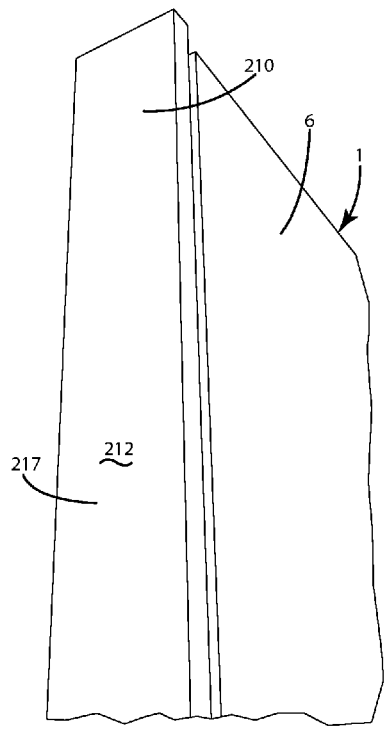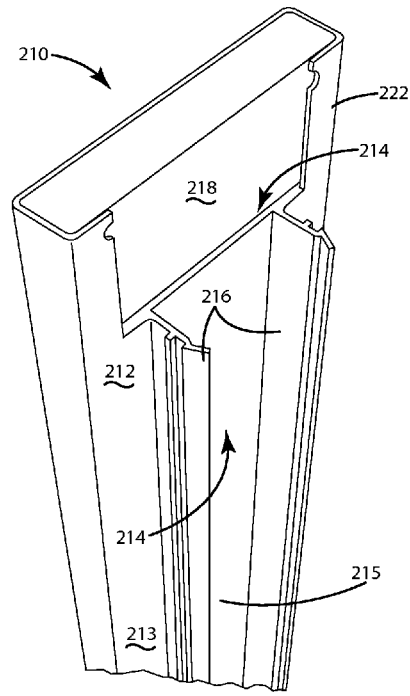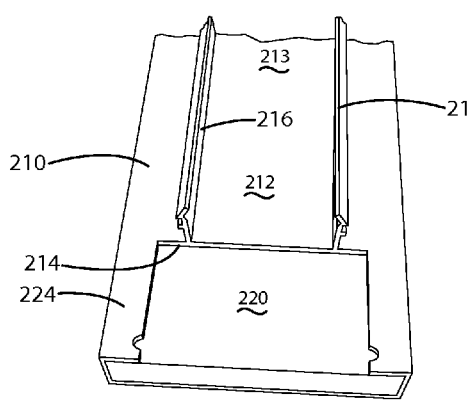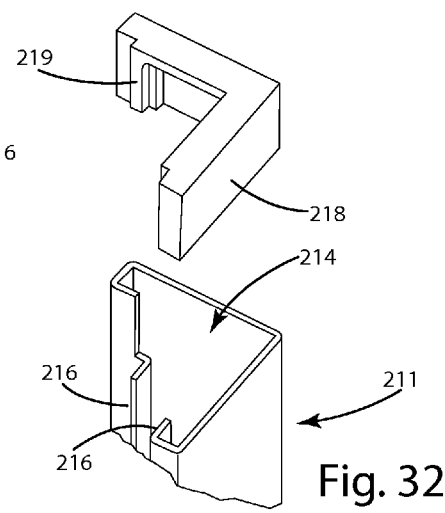
Fig. 29　　　　　Fig. 30
Fig. 31　　　　　Fig. 32

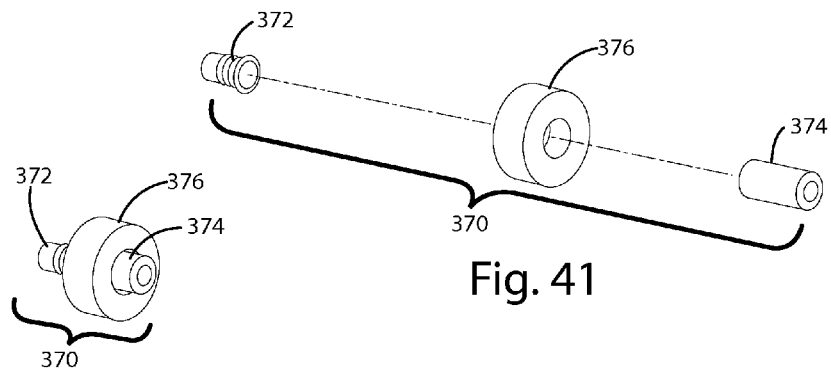
Fig. 41
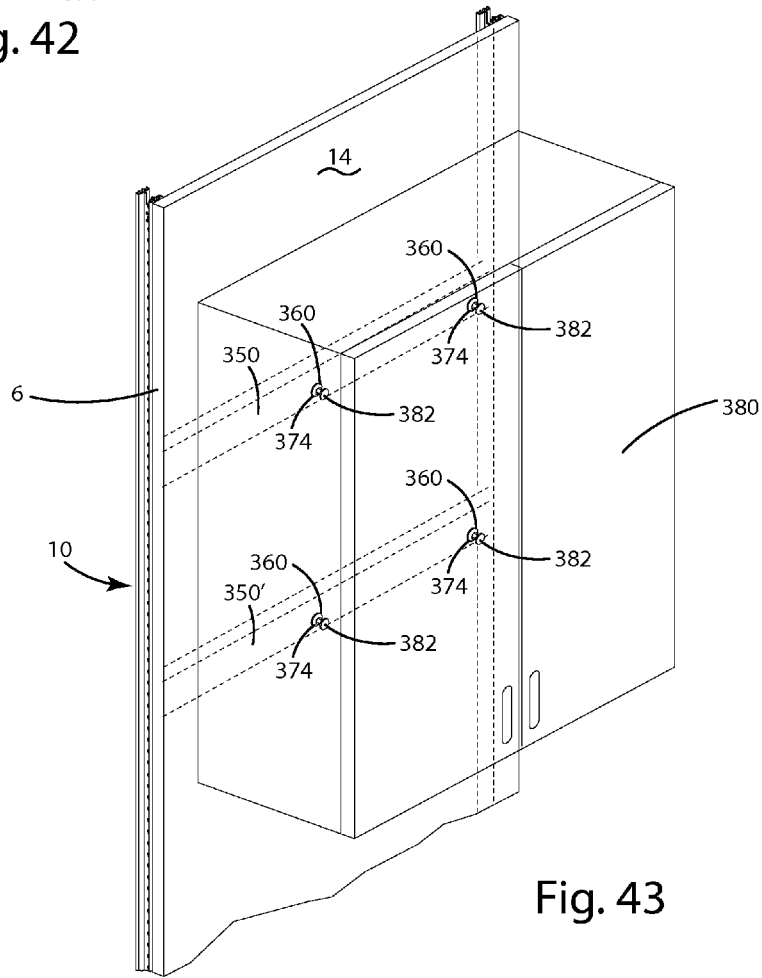
Fig. 42
Fig. 43

FLOOR-TO-CEILING PARTITION WALL ASSEMBLY

CROSS-REFERENCE TO RELATED APPLICATIONS

This application claims benefit of U.S. Provisional Application No. 61/702,018, filed Sep. 17, 2012, entitled "FLOOR-TO-CEILING PARTITION WALL ASSEMBLY"; U.S. Provisional Application No. 61/702,008, filed Sep. 17, 2012, entitled "VERTICALLY ADJUSTABLE DOOR ASSEMBLY"; U.S. Provisional Application No. 61/701,977, filed Sep. 17, 2012, entitled "MONITOR MOUNT ASSEMBLY"; and U.S. Provisional Application No. 61/701,969, filed Sep. 17, 2012, entitled "SLIDING DOOR ASSEMBLY", the entire contents of which are incorporated herein by reference.

FIELD OF THE INVENTION

The present invention generally relates to partition arrangements for open office spaces and the like, and in particular to a floor-to-ceiling panel wall assembly that is adaptable to suit a wide variety of open offices spaces and user preferences.

BACKGROUND OF THE INVENTION

Partition systems for open office spaces, and other similar settings, are well known in the art. Individual partition panels are interconnected in different configurations to form separate offices, workstations, or work settings. The partition panels are extremely durable and can be readily disassembled and reassembled into alternative configurations to meet the ever-changing needs of the user.

Partition systems can be adapted to provide privacy is some areas, generally using a floor-to-ceiling partition system, while also allowing for open communication in other areas, which is better provided by low height, see-over partition systems.

The finishing, fitting-out or build-out of open building spaces for offices and other similar environments has become a very important aspect of effective space planning and lay-out. Work patterns, technology, and business organizations are constantly evolving and changing and so too are the needs of each individual user. The building space users require products which facilitate change at lower costs while also having the adaptability necessary to provide a clean and uniform aesthetic appearance in assembly. Changing technology and changing work processes demand that a design and installation be able to support and anticipate change. At the same time, appearance of the building space has become increasingly important to customers and occupants, particularly as companies have realized the importance and positive (or negative) effect on worker's attitudes and their ability to do a job efficiently. Accordingly, one very important requirement of this integrated furnishing system is to provide a floor-to-ceiling partition wall assembly that is adaptable to suit a wide variety of open offices spaces and user preferences while also providing a novel attractive appearance even after reconfiguration.

BRIEF SUMMARY OF THE INVENTION

One aspect of the present invention includes a panel wall assembly including a frame assembly and a trim member operably coupled to the frame assembly. The trim member includes a body portion comprising a channel extending along a length thereof and further includes a first open end and a second open end. A middle portion of the trim member is disposed between the first open end and the second open end. A first seal member is disposed on the first open end of the channel and a second seal member is disposed within the second open end of the channel. The first and second seal members are not disposed within the middle portion of the channel of the trim member in assembly.

Another aspect of the present invention includes a panel assembly having a trim member with an elongate body portion. The trim member includes a substantially hollow channel extending along a length of the body portion. The channel includes a first end and a second end and middle portion located between the first end and the second end. A first acoustical seal member is disposed within the first end of the channel and is separate from the body portion. A second acoustical seal member is disposed within the second end of the channel and is separate from the body portion. The middle portion of the channel is open between the first and second acoustical seals in assembly.

Yet another aspect of the present invention includes a panel wall assembly having a frame assembly including vertical frame members. A trim member includes a body portion configured to cover a vertical side edge of the frame assembly at an end run thereof. The body portion includes an outer surface and an inner surface disposed in a laterally spaced apart relationship. A channel is disposed between the outer surface and the inner surface of the trim member and includes an upper end and a lower end with a body portion disposed therebetween. A first acoustical seal member is disposed within the upper end of the channel and closes the upper end of the channel. A second acoustical seal member is disposed within the lower end of the channel and closes the channel at the lower end. The second acoustical seal member is spaced apart from the first acoustical seal member such that the body portion of the channel is accessible between the outer surface and the inner surface of the trim member These and other features and advantages of the present invention will be further understood and appreciated by those skilled in the art by reference to the following specification, claims, and appended drawings.

BRIEF DESCRIPTION OF DRAWINGS

In the drawings:

FIGS. 20 and 21 are perspective views of a spring-loaded top support member mounted to a skin assembly;

FIG. 22 is a perspective view of a spring-loaded hook engagement member;

FIG. 24 is a perspective view of a frame assembly having acoustical seals;

FIG. 25 is a perspective view of an acoustical seal assembly;

FIG. 26 is a side elevational view of an acoustical seal assembly;

FIG. 27A is a perspective view of an acoustical seal assembly coupled to a horizontal frame member;

FIG. 29 is a perspective view of a panel wall assembly having an end trim member;

FIG. 30 is a perspective view of an end trim member having an upper acoustical seal;

FIG. 31 is a perspective view of an end trim member having a lower acoustical seal;

FIG. 32 is an exploded view of an angled end trim member and an acoustical seal;

FIG. 41 is an exploded view a mounting assembly;

FIG. 42 is a perspective view of an assembled mounting assembly;

FIG. 43 is a perspective view of a panel system having a cabinet accessory, shown in phantom, coupled to mounting assemblies of upper and lower structural reinforcement members shown in phantom;

DETAILED DESCRIPTION OF PREFERRED EMBODIMENTS

Figure 1:
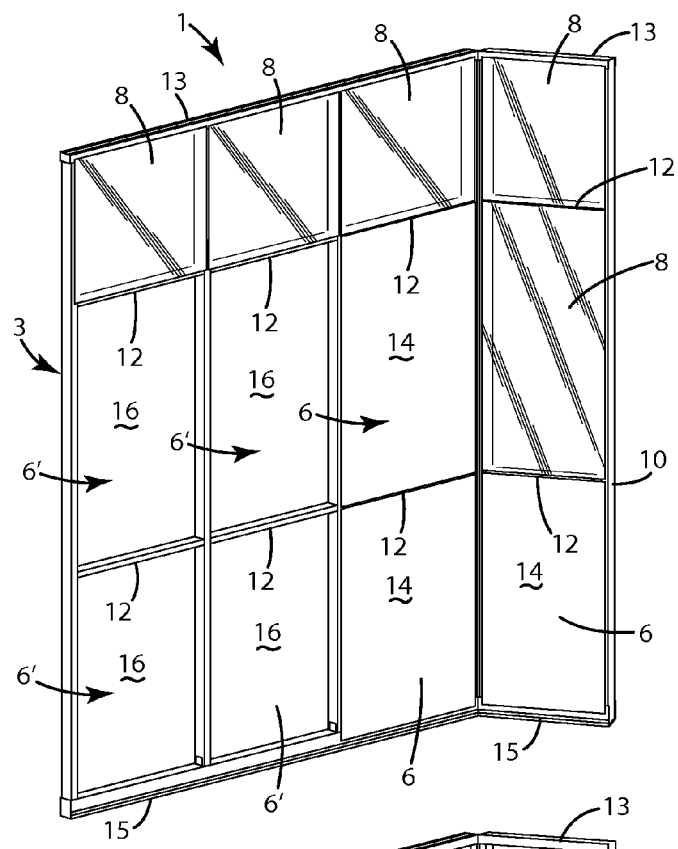
FIG. 1 is a perspective view of a panel wall system according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Figure 2:
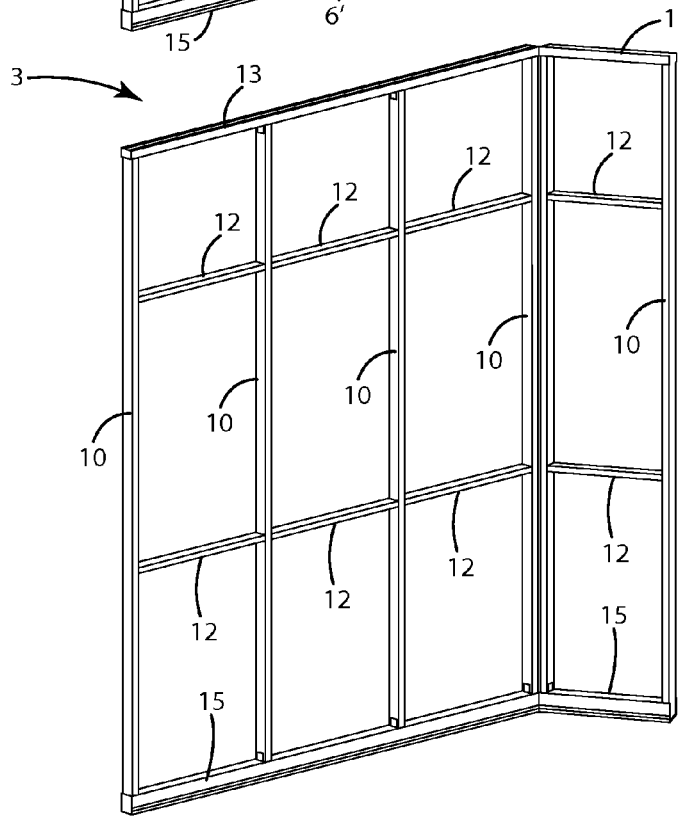
FIG. 2 is a perspective view of a frame assembly.

Referring now to FIG. 1, the reference numeral 1 generally designates a reconfigurable floor-to-ceiling panel wall system embodying the present invention, which is particularly designed for use in office spaces, and other similar work environments. In the illustrated example, the reconfigurable office panel wall system 1 includes a frame assembly 3 supporting a plurality or series of panel assemblies 6 in a floor-to-ceiling arrangement. As shown in FIGS. 1 and 2, the frame assembly 3 includes a plurality of vertical frame members 10 and horizontal frame members 12 with a ceiling track 13 disposed along an upper portion, and cover members or base assemblies 15 disposed along a lower portion. The panel wall system 1 includes various types of skin assemblies shown in FIG. 1 as solid or opaque skin or panel assemblies 6, 6' and translucent or glass skin assemblies 8. The translucent or glass skin assemblies 8 are adapted to allow light to pass therethrough for illuminating an office space arrangement as dictated by a user's design preferences. The solid panel assemblies 6 generally include an outer facing aesthetic surface 14, shown on panel assemblies 6, and an inwardly facing inner surface 16, as shown on panel assemblies 6'. In assembly, the panel wall system 1 is configured to have a first skin or panel assembly 6 disposed on one side of the frame assembly 3, with a second skin assembly 6' disposed on an opposite side of the frame assembly 3 in a substantially parallel spaced apart relationship.

Figure 4:
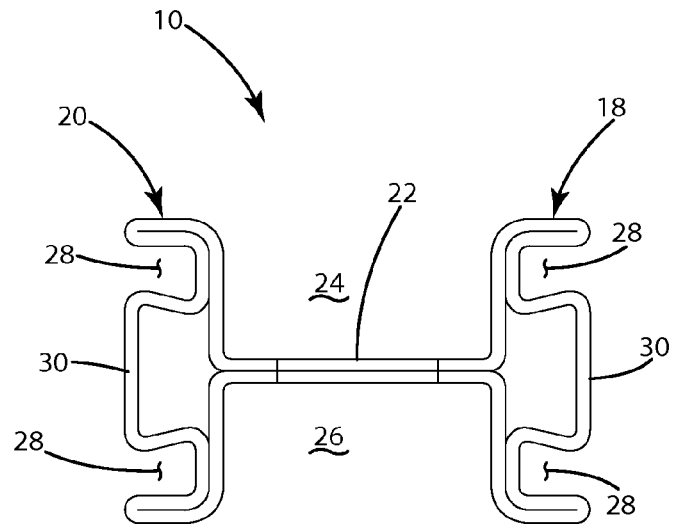
FIG. 4 is a cross-sectional view of a vertical frame member.
Figure 3:
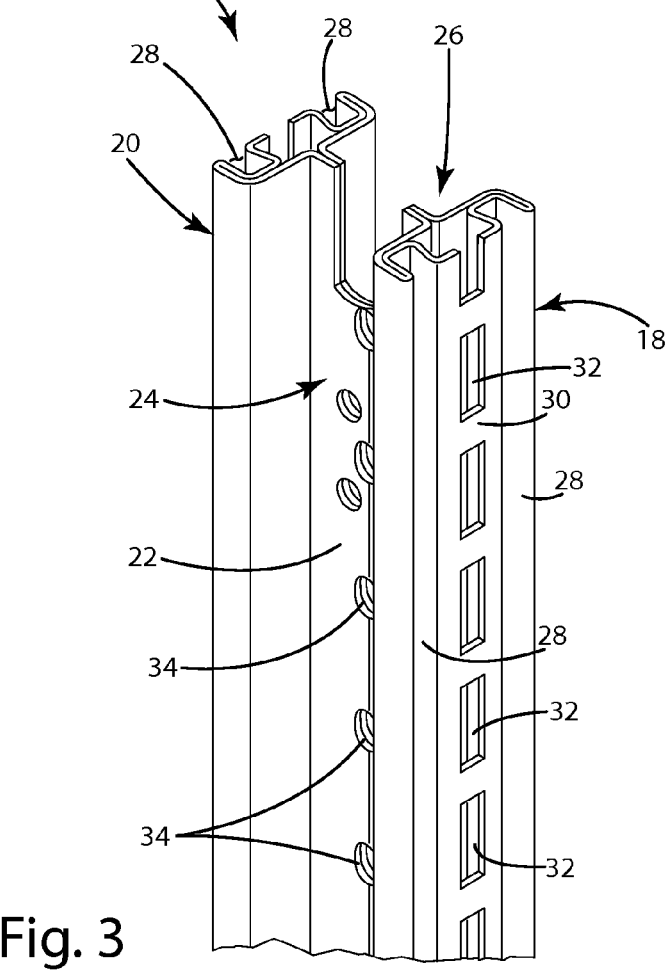
FIG. 3 is a perspective view of a vertical frame member.
Figure 5:
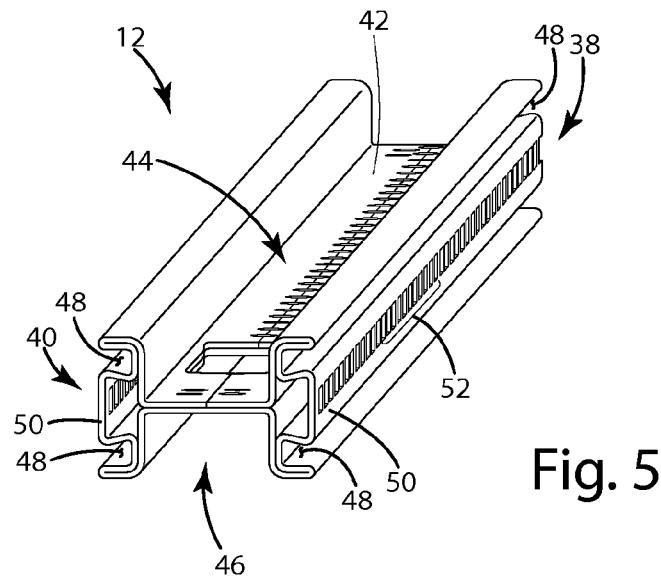
FIG. 5 is a perspective view of a horizontal frame member.
Figure 6:
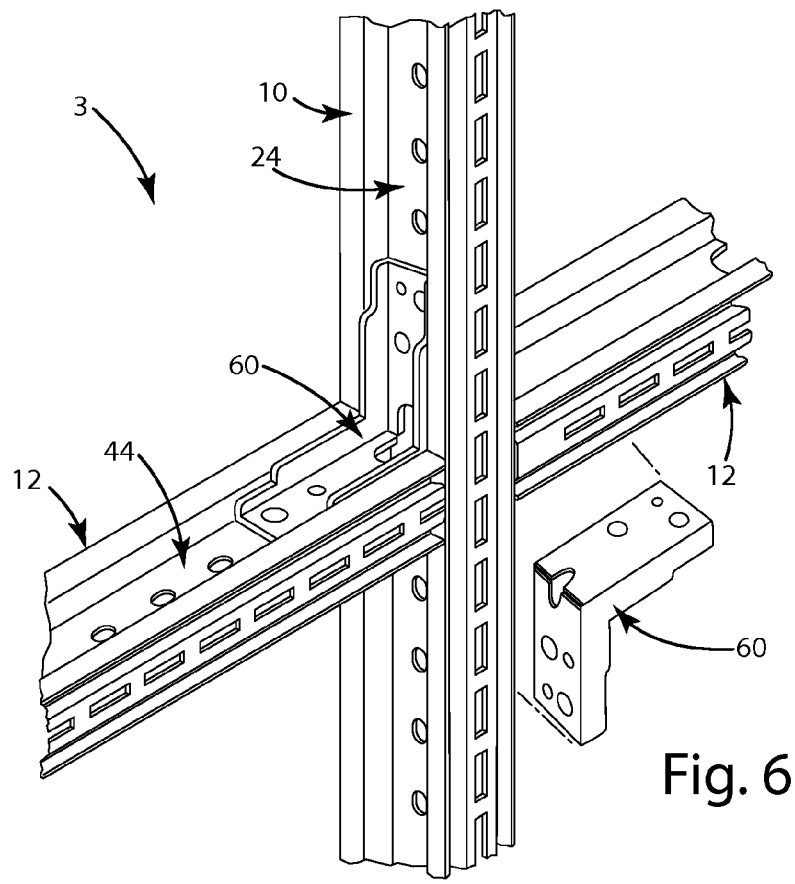
FIG. 6 is a perspective view of a frame assembly.

As noted above, the frame assembly 3 is comprised of vertical and horizontal frame members 10, 12 which are substantially similar in cross-section. As best illustrated in FIGS. 3 and 4, each vertical frame member 10 includes a generally "I"-shaped cross-section having a first end 18 and a second end 20 with a web portion 22 disposed therebetween defining central longitudinally extending first and second channels 24, 26. The first and second ends 18, 20 comprise outwardly opening channels 28 which are disposed on either side of a slotted channel 30 having slots 32 which are spaced along a length of the slotted channel 30. The web portion 22 further comprises apertures 34 for coupling of adjacent frame members or other frame components to the vertical frame member 10 in assembly. Similarly, as shown in FIG. 5, each horizontal frame member 12 also includes a generally "I"-shaped cross-section having a first end 38 and a second end 40 with a web portion 42 disposed therebetween defining central longitudinally extending first and second upwardly and downwardly opening channels 44, 46. The first and second ends 38, 40 similarly comprise outwardly opening channels 48 which are disposed on either side of a slotted channel 50, having slots 52 which are spaced along a length of the slotted channel 50. As shown in FIG. 6, the vertical and horizontal frame members 10, 12 couple to one another to form the structure of the frame assembly 3 using "L"-shaped brackets 60 which are adapted to couple to central channels 24, 44 and 26, 46 of both the vertical and horizontal frame members 10, 12 in assembly. "L"-shaped brackets 60 can be disposed above or below the horizontal frame member 12 as necessary to support and rigidify the connection between the vertical and horizontal frame members 10, 12.

Figure 7:
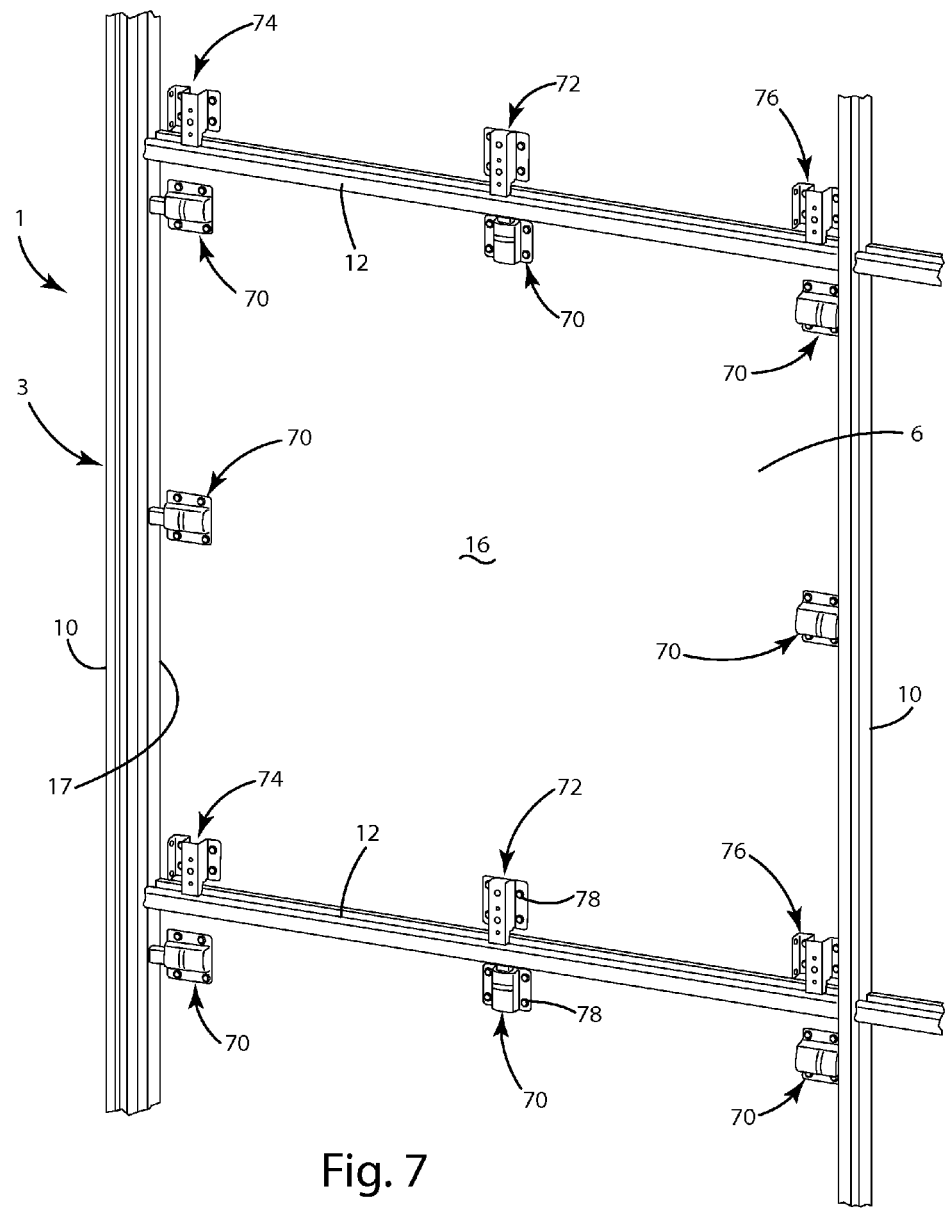
FIG. 7 is a perspective view of a panel wall system according to another embodiment of the present invention.

As noted above, and shown in FIG. 7, each solid panel assembly 6 includes an inwardly facing inner surface 16 having a plurality of latch mechanisms 70 spaced about the periphery thereof, one or more support members 72 spaced along a lower edge thereof, as well as positioning assemblies 74, 76 which are adapted to facilitate the positioning of a skin assembly on the frame assembly 3 as further described below. The latch mechanisms 70, the support members 72, and the positioning assemblies 74, 76 are secured to the inner surface 16 of a panel assembly 6 adjacent a perimeter or outer edge 17 of the panel assembly 6, as shown in FIGS. 7 and 10, using fasteners 78 such as self tapping screws and the like.

Figure 8:
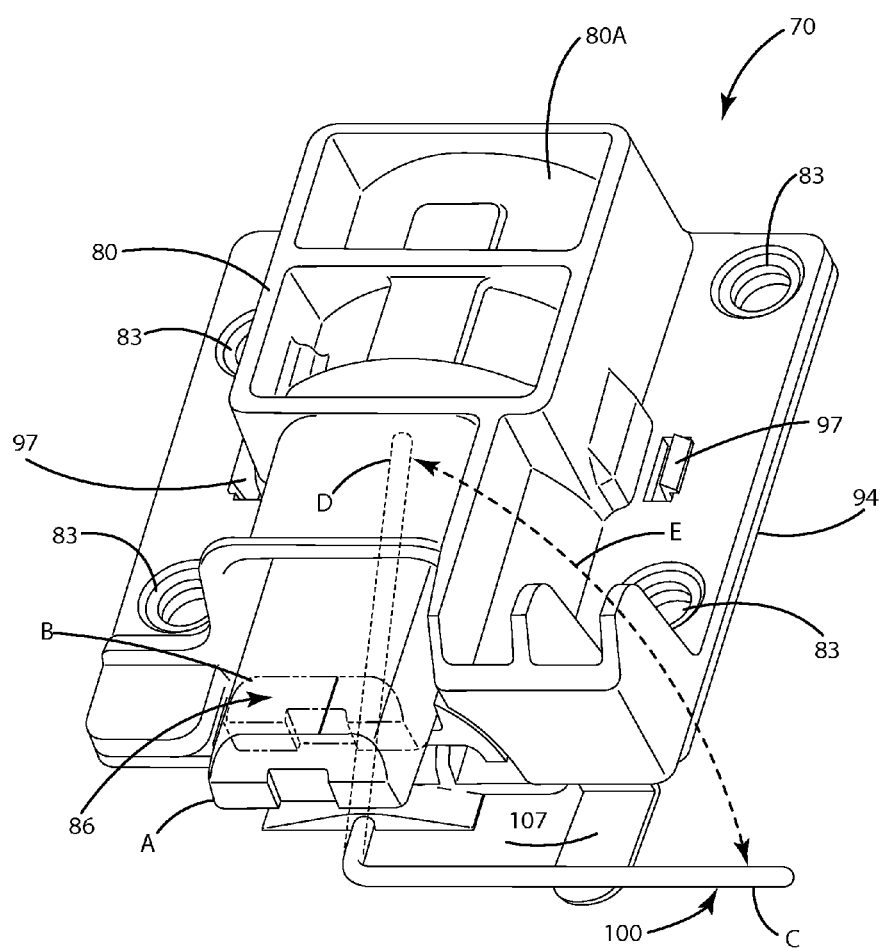
FIG. 8 is a perspective view of a latch mechanism.
Figure 9:
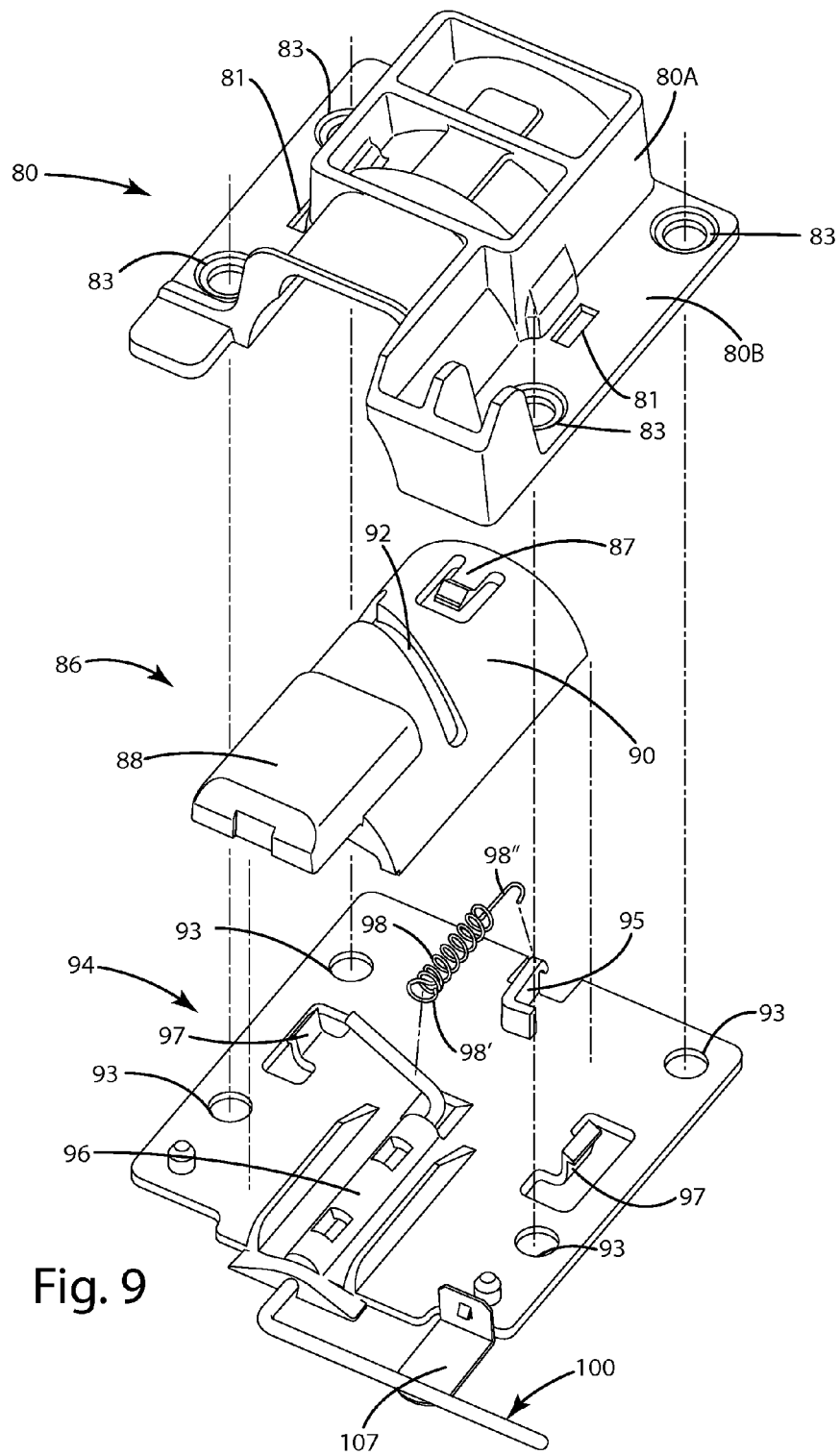
FIG. 9 is an exploded view of the latch mechanism of FIG. 8.

As shown in FIGS. 8 and 9, each latch mechanism 70 includes a housing member 80 with a latch member 86 telescopingly received therein. The latch member 86 is movable between a latched first position A and an unlatched second position B. A mounting portion or base portion 94 couples to the housing member 80 using clips 97. Thus, the housing portion 80 is disposed on the base potion 94 and latch member 86 is captured therebetween. As best shown in FIG. 9, the latch member 86 includes a latch portion 88 and a body portion 90 that is telescopingly received within a housing portion 80A of the housing member 80. The body portion 90 includes an actuation channel or groove 92 slidably engaged by an actuator lever 100 as further described below. The actuation groove 92 is a contoured cam surface that is angularly shaped such that a quarter turn of the actuator lever 100, along a path indicated by arrow E, between a recessed or retracted first position C and an extended or accessible second position D, moves the latch member 86 from the latched position A to the unlatched position B, respectively, as shown in FIG. 8. As further shown in FIG. 9, clip members 97 extend upwardly from the base portion 94 such that they are received in apertures 81 disposed on the housing member 80 to clip the housing member 80 to the base portion 94 as shown in FIG. 8. The housing member 80 further includes a planar portion 80B having apertures 83 which are adapted to align with apertures 93 disposed on the base portion 94. In this way, the latch mechanism 70 can be secured with fasteners to a panel assembly through aligned apertures 83,93. As further shown in FIG. 9, a clip member 87 is disposed on the body portion 90 of the latch member 86. In operation, the clip member 87 is adapted to retain the latch mechanism in the latched or unlatched positions A, B by interacting with features disposed on the upper portion of the housing portion 80A of the housing member 80. As further shown in FIG. 9, a biasing mechanism 98 includes first and second ends 98', 98" which are adapted to engage a portion of the actuator lever 100 and an attachment feature 95 disposed on the base portion 94 respectively. The biasing mechanism 98 is adapted to basis the actuator lever 100 to a recessed position as further described below with reference to FIG. 13.

Figure 10:
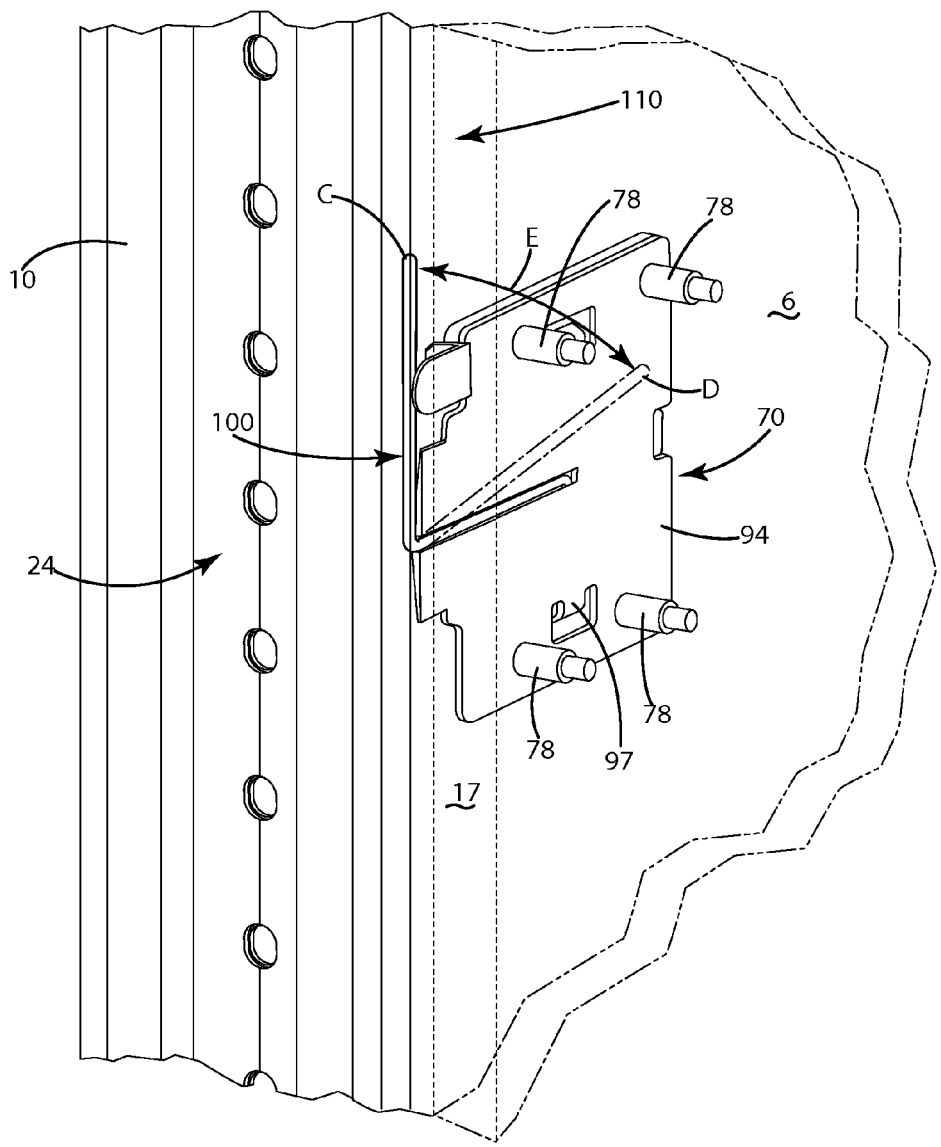
FIG. 10 is a perspective view of a panel assembly mounted to a vertical frame member having a latch mechanism mounted thereto.
Figure 28:
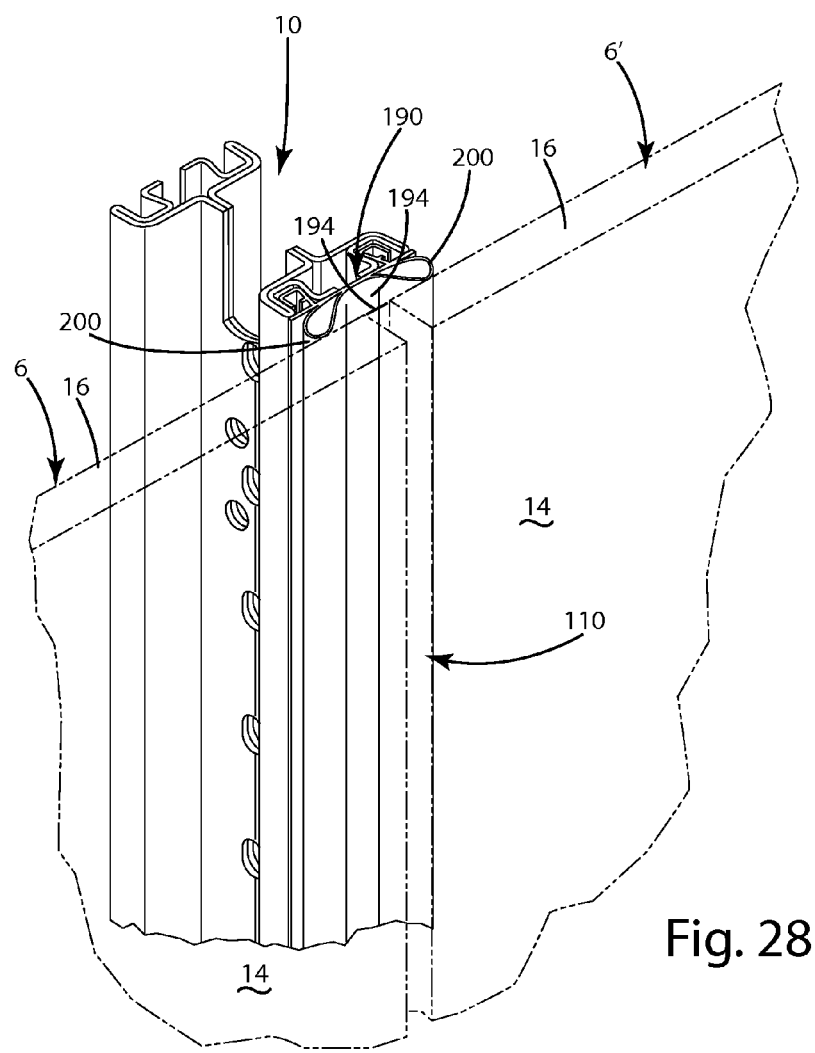
FIG. 28 is a perspective view of an acoustical seal assembly coupled to a vertical frame member with panel assemblies mounted thereto as shown in phantom.

As shown in FIG. 10, the actuator lever 100 is disposed within a gap 110 between adjacent skin assemblies when in the recessed position C, but is visible from the outer surface 14 and easily accessible when in the extended position D. Gap 110 is best shown in FIG. 28 between adjacent panel or skin assemblies 6, 6'. In this way, the actuation lever 100 serves as an indicator mechanism to positively indicate when a skin assembly, such as skin assembly 6 shown in FIG. 10, is fully engaged with a vertical or horizontal member of the frame assembly 3, such as vertical member 10 shown in FIG. 10. As an indicator mechanism, the actuator lever 100 is capable of visibly indicating the engagement status of a latch mechanism 70 with the panel wall system 1.

Figure 11:
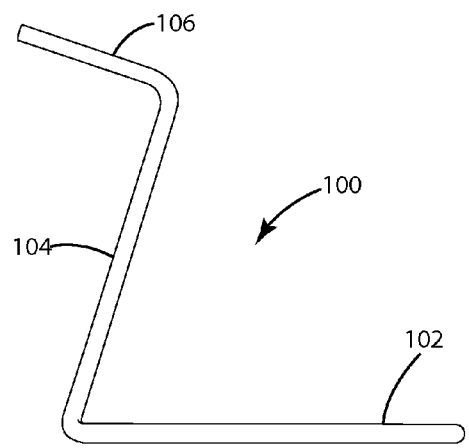
FIG. 11 is a perspective view of an actuator lever.
Figure 12:
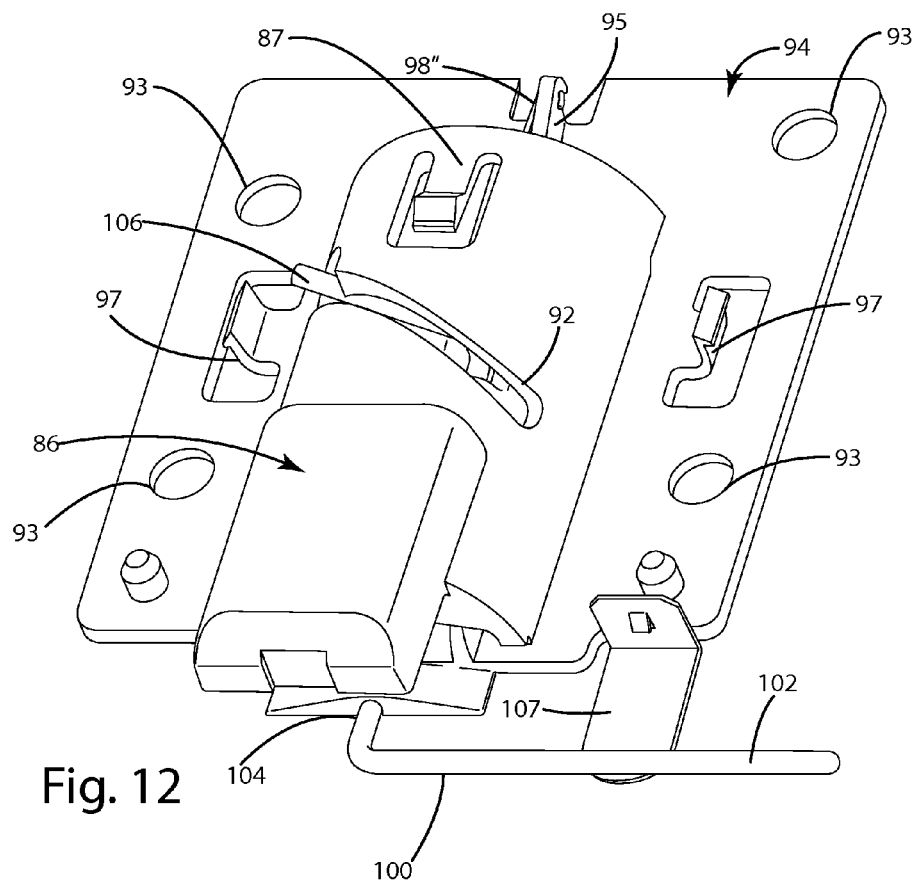
FIG. 12 is a perspective view of a latch member and a base plate.

As shown in FIGS. 11 and 12, the actuator lever 100 of each latch mechanism 70 comprises a handle portion 102 and an engagement portion 106 with a body portion 104 disposed therebetween. In assembly, the engagement portion 106 engages the actuation groove 92 disposed on the body portion 90 of the latch member 86. The handle portion 102 of actuation lever 100 is engaged by a panel installer to actuate the latch mechanism 70. It is noted that the handle portion 102 of the actuator lever 100 of the latch mechanism 70 is accessible from the aesthetic outer surface 14 of the panel assemblies 6 as mounted to the frame assembly 3, even though the latch mechanism 70 is secured to the inner surface 16 of the panel assembly 6.

As noted above and shown in FIG. 10, the handle portion 102 is seated within a gap 110 defined between the outer edge 17 of a solid panel assembly 6 and a component of the panel wall system 1, such as an adjacent panel assembly, as best shown in FIG. 28. Thus, FIG. 10 shows the actuation lever 100 in a recessed position C, thereby indicating positive engagement. As noted above, the latch mechanisms 70 act as indicator mechanisms to let users know when a panel assembly 6 is positively engaged or disengaged from the frame assembly 3. This is indicated by the handle portion 102 of a latch mechanism 70 being disposed outboard of an outer edge 17 of the panel assembly 6 in an extended position D, such as handle portion 102 shown in phantom in FIG. 10. Here, the handle portion 102 of the actuator member 100 is visible from and extends beyond the outer surface 14 of the panel assembly 6. The visibility of the handle portion 102 in an extended position D lets a user know that an associated panel is not properly engaged with the frame assembly 3. It is further contemplated that the actuator lever 100 can include a brightly colored handle portion 102, such as "caution yellow" color, to better visibly indicate to a user or installer when a skin assembly 6 is not positively engaged with the frame assembly 3 and needs adjustment. A latch member 86 of latch mechanism 70 is in the latched position A and shown secured to channel 26 of a vertical member 10 of a frame assembly 3 in FIG. 14. As noted above, gaps 110 are formed between the outer edge 17 of a panel assembly 6 and a component of a panel wall system, wherein the component could be an adjacent panel assembly, a furniture component, a glass panel assembly 8 (FIG. 1), a wall panel accessory or the like. The gaps 110 are contemplated to be approximately 6 mm, plus or minus 1 mm. As shown in FIGS. 8-9, and 12-13, a wire or lever stop member 107 may also be coupled to the base portion 94 of the latch mechanism 70 to prevent the actuator lever 100 from moving too far towards the recessed position C, thus keeping the lever 100 accessible to a user.

Figure 13:
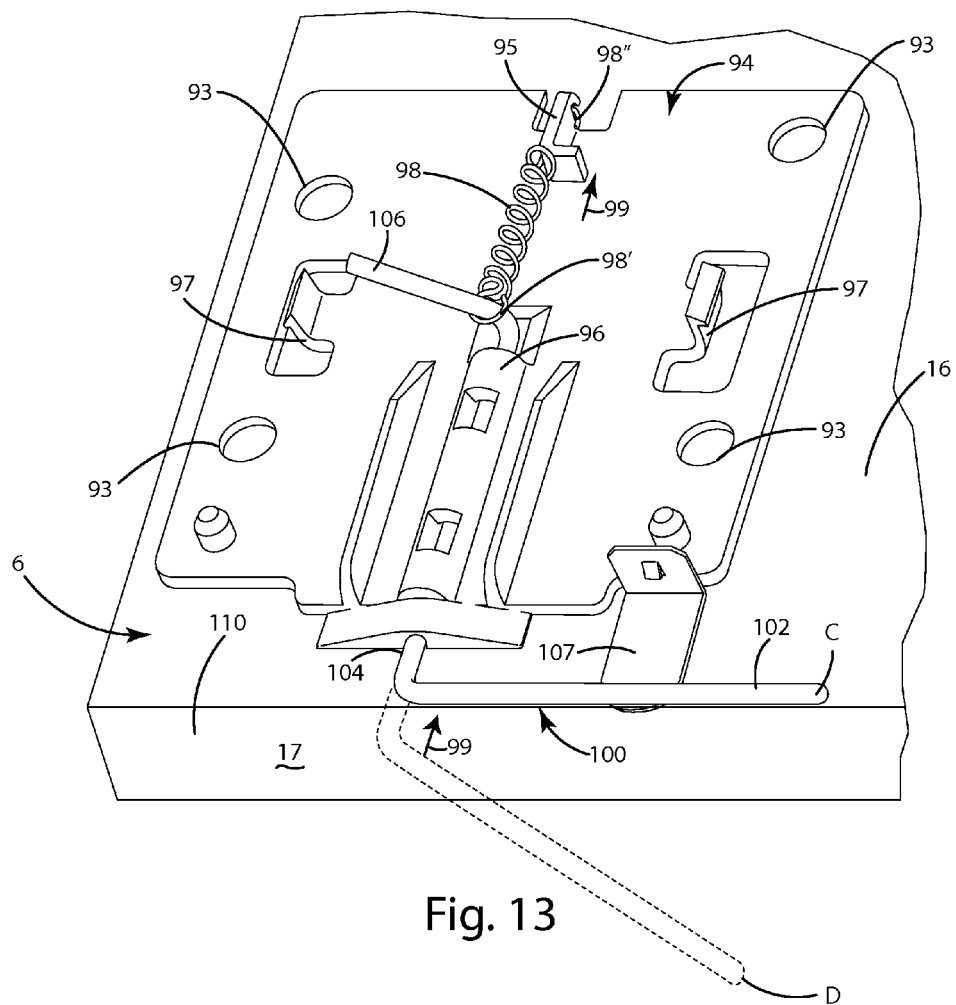
FIG. 13 is a perspective view of an actuator lever partially disposed within a base plate which is coupled to a panel assembly.
Figure 14:
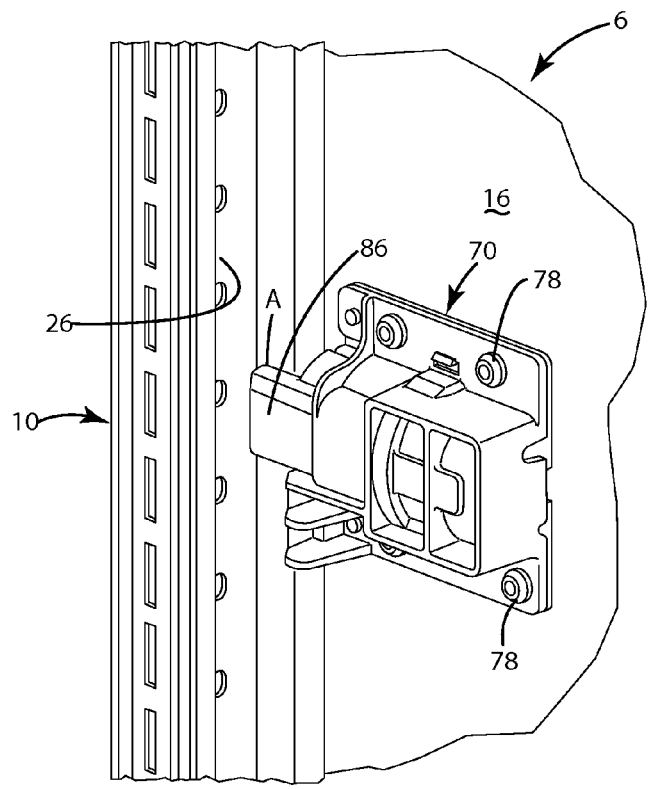
FIG. 14 is a perspective view of a latch mechanism as coupled to a vertical frame member.

As shown in the embodiment of FIG. 13, a portion of the body 104 of the actuator lever 100 is disposed within a housing channel 96 disposed within the base plate member 94. The actuator lever 100 is biased inwardly in a direction 99 by a biasing member, such as biasing spring 98 having a first end 98' that is coupled to engagement portion 106 of the lever 100. A second end 98" of spring 98 is coupled to an attachment feature 95 disposed on base plate 94. Thus, when in the recessed position D and seated within a panel gap 110, the actuator lever 100 is biased inwardly by the biasing spring 98, such that the actuator lever 100 is fully concealed behind the inner surface 16 of the panel assembly 6 and out of view of the panel wall system occupants. In this way, the actuator lever 100 is disposed inboard of the outer edge 17 of the panel assembly 6 when in the recessed position C, and disposed outboard of the outer edge 17 of the panel assembly in the extended position D.

Figure 15:
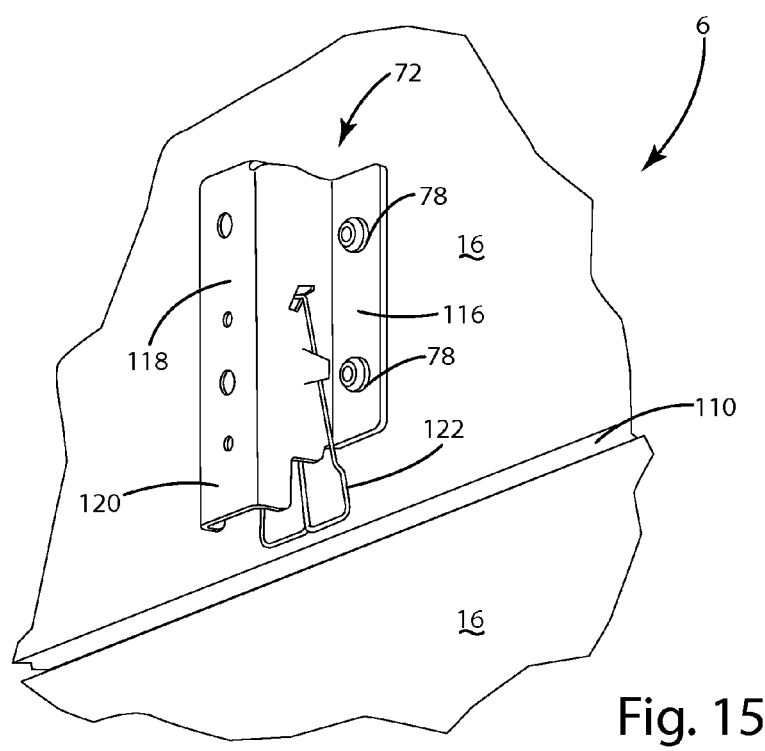
FIG. 15 is a perspective view of a support member mounted to a panel assembly.
Figure 16:
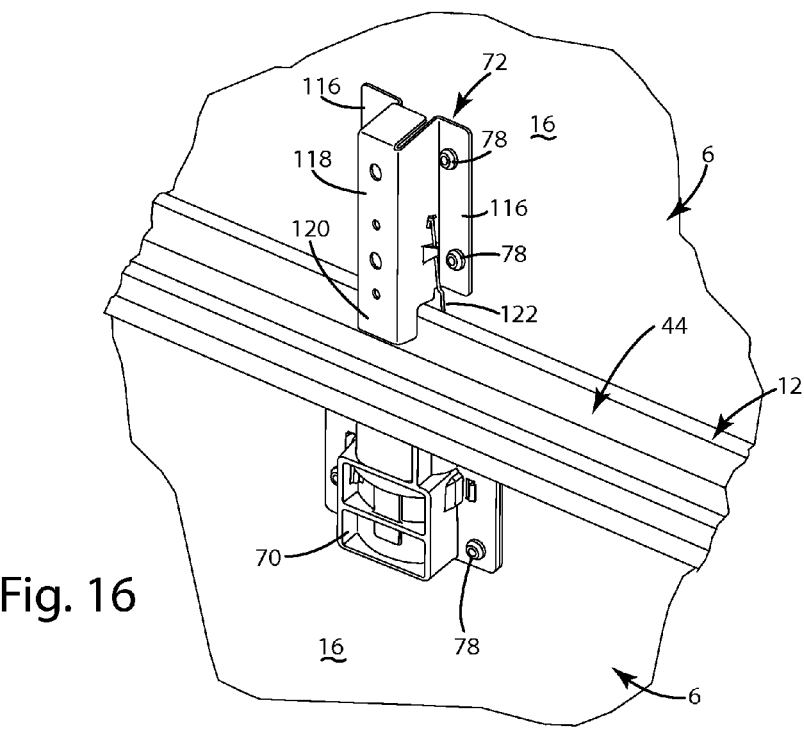
FIG. 16 is a perspective view of the support member of FIG. 15 as mounted to a horizontal frame member.

As noted above, and shown in FIG. 7, the panel assemblies 6 further comprise support members 72 secured to the inner surface 16 of the solid panel or skin assembly 6 using fasteners 78. As best shown in FIGS. 15 and 16, each support member 72 includes a housing portion 118 disposed between mounting portions 116. In assembly, the mounting portions 116 are generally planar portions used to couple the support members 72 to a lower portion of the inner surface 16 of a solid panel assembly 6. At a lower end of the support members 72, the housing portion 118 defines a downwardly opening hook portion 120 that engages the longitudinally extending channel 44 of an associated horizontal frame member 12. In assembly, the solid panel or skin assembly 6 is positioned with respect to the frame assembly 3 such that the hook portion 120 of each of the support members 72 engages the longitudinally extending channel 44 of an associated horizontal frame member 10. The top edge of the solid panel assembly 6 is then rotated towards the frame assembly 3, and latch mechanisms 70 are actuated to engage a corresponding horizontal or vertical frame member 10, 12 thereby securing the solid panel assembly 6 to the overall frame assembly 3. Panel installation is further described below with reference to FIGS. 52-56. The support members 72 further comprise panel biasing wire springs 122, which function to bias the skin assemblies 6 outward from the frame member 3 as further described below.

Figure 17:
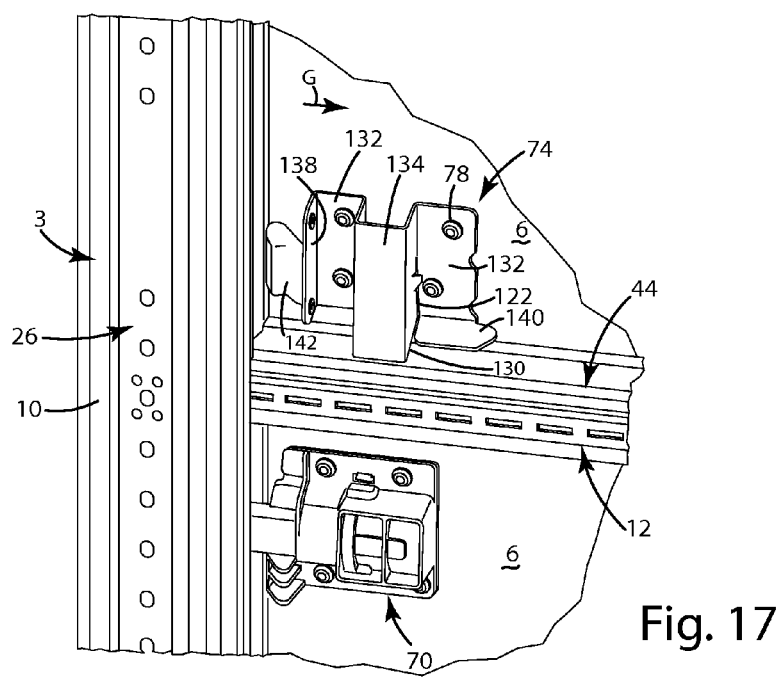
FIG. 17 is a perspective view of a panel positioning assembly as mounted to a frame assembly.
Figure 18:
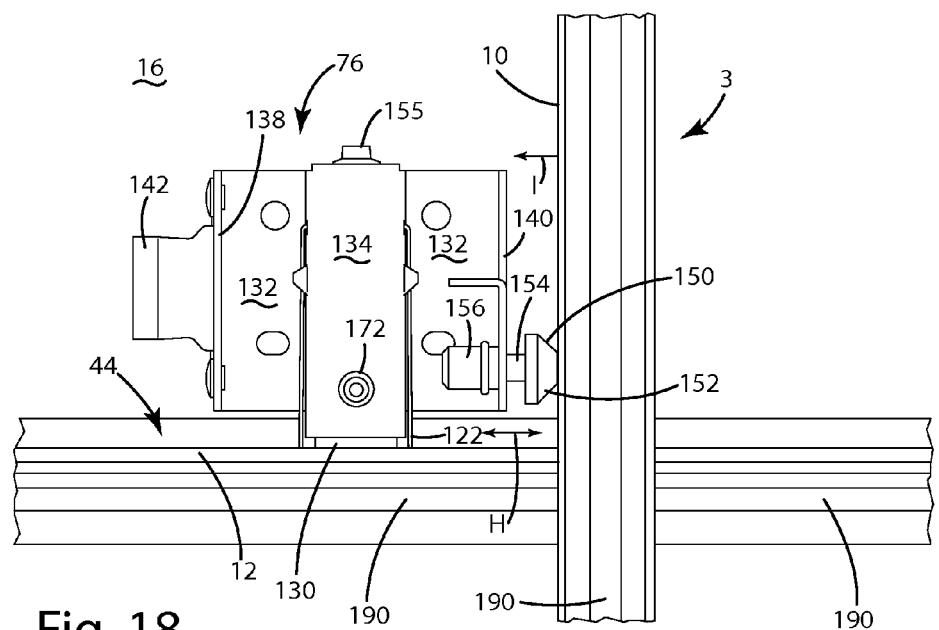
FIG. 18 is a perspective view of another panel positioning assembly as mounted to a frame assembly.

As noted above and shown in FIGS. 17 and 18, each solid panel assembly 6 may include both right and left positioning assemblies 74, 76 which are spaced along a lower edge of the panel assembly 6. As best illustrated in FIG. 7, the latch mechanisms 70, the support members 72 and positioning assemblies 74, 76 are all secured to the inner surface 16 of the panel assemblies 6 using fasteners 78 which can be self tapping screws and other like fasteners. Each positioning member 74, 76 includes a downwardly opening hook portion 130 that engages an upwardly opening channel 44 of an associated horizontal frame member 12 in a similar manner as the engagement of the hook portions 120 of the support members 72. Further, the hook portion 130 can be adjustable as described below. Each positioning assembly 74, 76 further includes a housing portion 134 disposed between two mounting portions 132. In assembly, the mounting portions 132 are generally planar portions used to couple the positioning support members 74, 76 to the inner surface 16 of the solid panel assembly 6. The positioning assemblies 74, 76 further comprise first and second flanges 138, 140 which are used as attachment surfaces for various positioning features. Specifically, the left positioning assembly 74 (FIG. 17) comprises a biasing spring member 142 coupled to first flange 138 which engages a vertical frame member 10 in assembly to bias the panel assembly 6 to the right as indicated by arrow G. As shown in FIG. 18, right positioning support member 76 comprises a horizontally adjustable conical shaped positioning member 150 which is attached to second flange 140. The conical shaped positioning member 150 comprises a conical shaped head portion 152 and a threaded support shaft 154 which engages a threaded member 156 in assembly which is disposed on the second flange 140. The conical shaped positioning member 150 is horizontally adjustable by rotating the threaded shaft 154 relative to the threaded member 156 thereby moving the conical shaped head portion 152 to a desired horizontal positioning location along a direction as indicated by arrow H. Thus, the conical shaped positioning member 150 is laterally adjustable to accommodate varying configurations of the frame assembly 3. The positioning assembly 76 shown in FIG. 18 further includes a biasing spring member 142 coupled to first flange 138, although as positioned on the inner surface 16 of the panel assembly 6, the biasing spring 142 is not used to position the associated panel 6.

In assembly, the downwardly opening hook portions 130 of the left and right positioning assemblies 74, 76 engage the upwardly opening channel 44 of a horizontal frame member 10, much like the downwardly opening hook portions 120 of support members 72 discussed above. As the panel assembly 6 is rotated upward into its upright position, the conical shaped positioning member 150 of right positioning support member 76 engages a side wall of a vertical frame member 10 and the conical shaped head 152 is positioned such that interaction between the conical shaped head 152 and the side wall of the upright 10 will move the panel assembly 6 laterally to the left as indicated by arrow I (FIG. 18). This movement to the left as indicated by arrow I causes for engagement of the biasing spring member 142, disposed on the left positioning assembly 74, with an opposite vertical frame member 10 as shown in FIG. 17. The left and right designation of the positioning features noted above is not intended to limit the configuration of the positioning features on the positioning assemblies 74, 76 in use. The left and right positioning assemblies 74, 76 further comprise wire biasing springs 122 which function to bias the skin assemblies 6 outward from the frame member 3 as further described below.

Figure 19A:
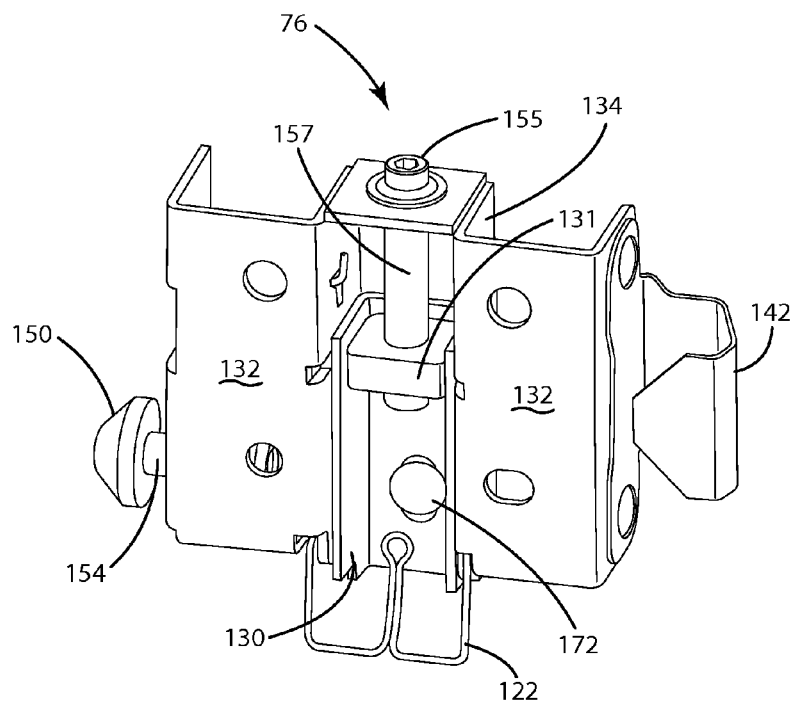
FIG. 19A is a bottom perspective view of the positioning assembly of FIG. 18.

As shown in FIG. 19A, and noted above, the positioning assemblies 74, 76 may include a housing portion 134 which is coupled to an adjustable downwardly opening hook portion 130 which is vertically adjustable using an adjustment mechanism 155 shown as an adjustment screw in FIG. 19A. The adjustment screw 155 has a threaded shaft component 157 that engages an engagement block 131 disposed on the adjustable downwardly opening hook portion 130. Once vertically positioned using adjustment screw 155, the downwardly opening hook portion 130 of positioning assembly 76 remains fixed in place. The downwardly opening hook portion 130 of positioning assembly 76 is coupled to the housing 134 using a fastener 172.

Figure 19B:
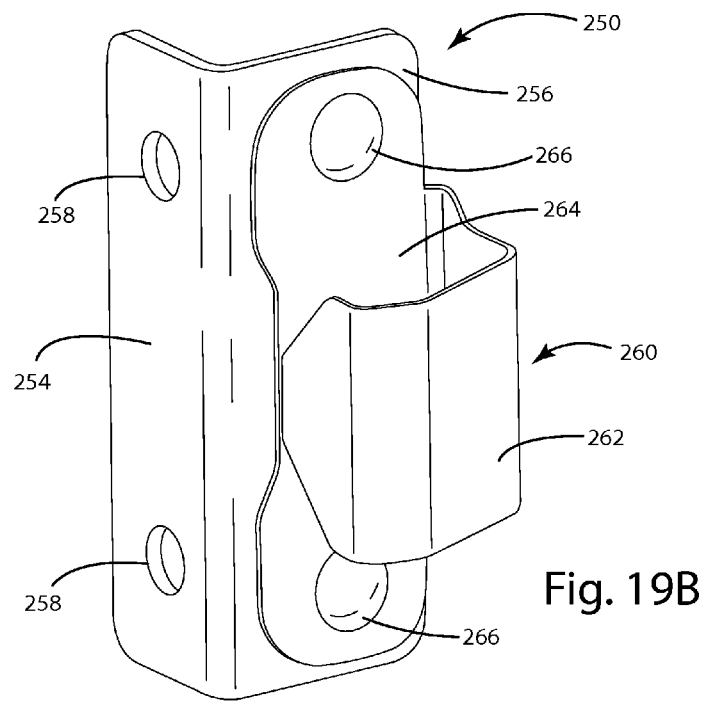
FIG. 19B is a perspective view of another embodiment of a positioning assembly.
Figure 55:
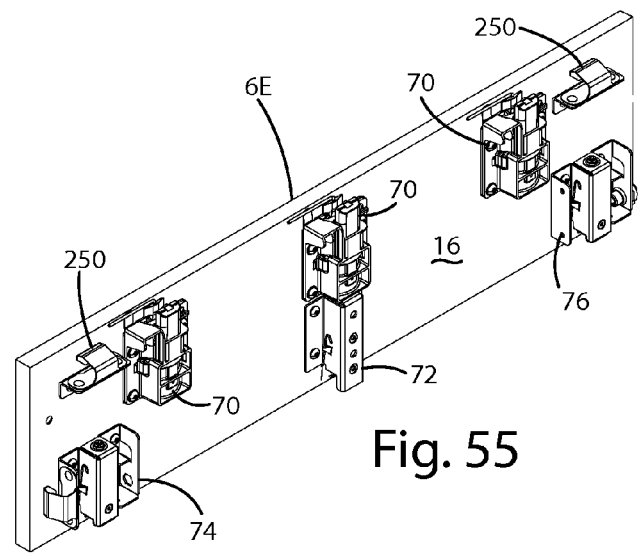
FIG. 55 is a rear perspective view of a panel assembly.

Referring now to FIG. 19B, another embodiment of a positioning assembly 250 is shown, wherein the positioning assembly 250 includes first and second portions 254, 256 which are substantially perpendicular to one another giving the position assembly 250 an overall L-shaped configuration. Apertures 258 are disposed on the first portion 254 and are adapted to receive fasteners to secure the position assembly 250 to the inner surface 16 of a panel assembly 6E as shown in FIG. 55. The second portion 256 includes a biasing spring member 260 having a resilient spring portion 262 and a generally planar attachment portion 264. Fasteners 266 are used to couple the biasing spring 260 to the second portion 256 of the positioning assembly 250. In operation, biasing spring 260 functions in a similar manner to biasing spring 142 described above.

Figure 19C:
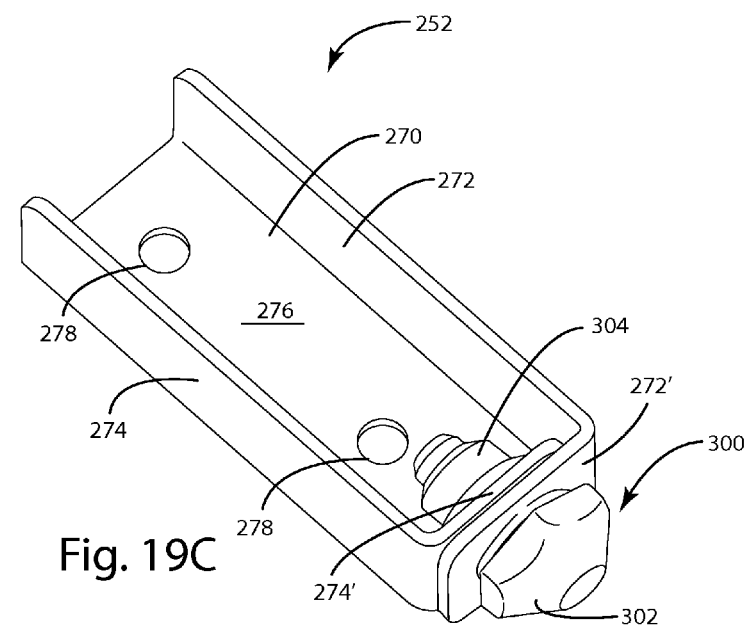
FIG. 19C is a perspective view of another embodiment of a positioning assembly.

Referring now to FIG. 19C, another embodiment of a positioning assembly 252 is shown. Positioning assembly 252 is a generally fixed positioning assembly having a body portion 270 which includes side walls 272, 274 and attachment surface 276, thereby giving the positioning assembly 252 an overall U-shaped cross-section. Apertures 278 are disposed on the attachment surface 276 and are used to fasten the position assembly 252 to an inner surface 16 of a panel assembly 6. In a front portion of the positioning assembly 252, flange portions 272', 274' are turned in portions of side walls 272, 274 respectively and include an aperture disposed therethrough (not shown) for receiving a positioning member 300 having a conical-shaped head portion 302 and a threaded member 304 which engages a threaded shaft 303, such that the positioning member 300 operates in a similar manner as positioning member 150, described above with reference to FIG. 18, to provide a fixed positioning assembly 252 that is customizable for a particular panel installation. It is further contemplated that the positioning member 300 may include an externally disposed shaped portion disposed on threaded member 304, to laterally adjust the positioning of the head portion 302.

As shown in FIGS. 20-23B, solid panel assemblies 6 that are adjacent to the upper portion of the frame assembly 3 may further include one or more spring-loaded top support members 160 spaced along the upper edge of the panel assembly 6. Depending on the horizontal span of a particular solid panel assembly 6, any number of spring-loaded top support members 160 can be attached to the inner surface 16 of a panel assembly 6 to provide sufficient support to the panel assembly 6 from the frame assembly 3.

Figure 23A:
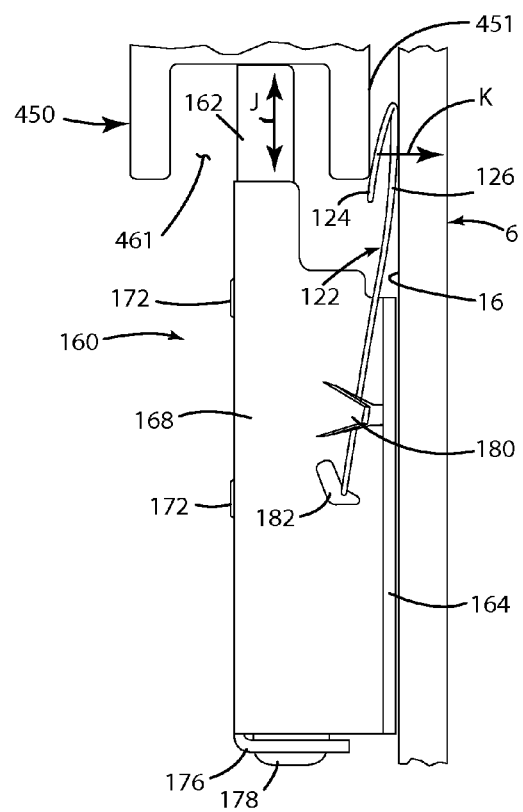
FIG. 23A is a side elevational view of a spring-loaded top support member mounted to a skin assembly and coupled to a frame member.

Each spring-loaded top support member 160 includes an upwardly opening hook portion 162 that is spring-loaded and engages an associated downwardly opening channel 46 of a horizontal frame member 12 in assembly as shown in FIG. 23A. Specifically, the spring-loaded top support member 160 includes generally planar mounting portions 164 having apertures 166 for connecting the spring-loaded top support member 160 to the inner surface 16 of a solid panel assembly 6 using fasteners, such as self tapping screws and the like. Between the mounting portions 164, a housing portion 168 is disposed which houses the spring-loaded upwardly opening hook portion 162. As shown in FIG. 20, the upwardly opening hook portion 162 is spring-loaded and adapted to plunge in and out of the housing portion 168 in a substantially vertical direction indicated by arrow J. A biasing spring member 170 biases or loads the upwardly opening hook portion 162 to an extended position as shown in FIG. 20. As shown in FIGS. 20-22, fastener guides 172 are adapted to couple the upwardly opening hook portion 162 to a top wall of the housing portion 168. The upwardly opening hook portion 162 further includes one or more elongate channels or apertures 174 in which fastener guides 172 are received. The fastener guides 172 are not tightened on the elongate apertures 174 and therefore serve as guides to the upwardly opening hook portion 162 as it slidably plunges into and out of the housing portion 168 along a length of the apertures 174 in assembling the panel wall system 1. As shown in FIG. 23A, and FIG. 21 with the housing portion 168 in phantom, the spring-loaded top support member 162 further comprises a back plate 176 disposed on a rear portion of the housing 168, wherein a fastener 178 couples biasing spring 170 to the housing portion 168.

Figure 23B:
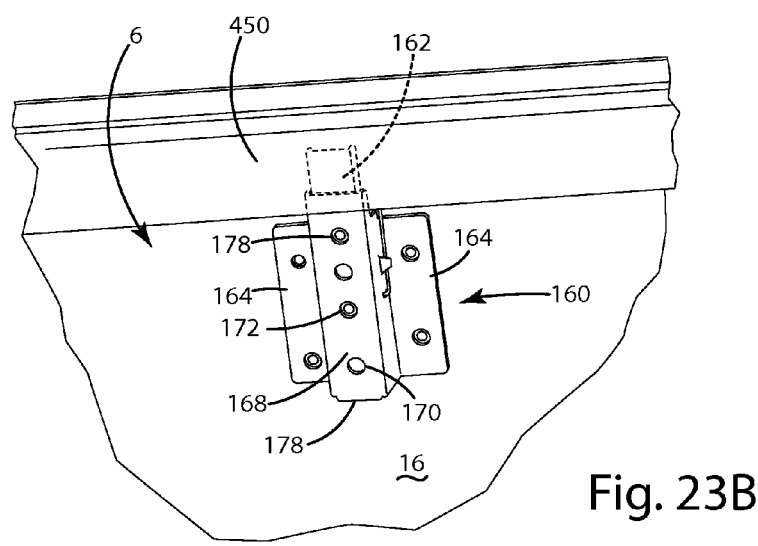
FIG. 23B is a perspective view of a spring-loaded top support member mounted to a skin assembly and coupled to a frame member with a portion of the support members shown in phantom.

As shown in FIGS. 23A and 23B, the spring-loaded top support member 160 is coupled to panel assembly 6 and the upwardly opening hook portion 162 is engaged with a downwardly open longitudinally extending channel 461 of a structural upper horizontal frame member 450. As shown in FIGS. 22-23B, the spring-loaded top support member 160 further comprises a biasing wire spring member 122, in a similar configuration as the biasing wire spring members 122 found on the support members 72 and the positioning assemblies 74, 76. The biasing wire spring member 122 of the spring-loaded top support member 160 serves the same purpose as the wire spring members 122 noted above, and now discussed in detail. The biasing wire spring member 122 is coupled to the housing portion 168 and includes a spring finger 124. The biasing wire spring member 122 is coupled to the housing portion 168 at spring clips 180 and apertures 182 disposed on side walls of the housing portion 168 which provide a point of leverage for the biasing wire spring member 122. In assembly, the biasing wire spring member 122 contacts the inner surface 16 of an associated panel assembly 6 at a contact portion 126 of the spring member 122. The spring finger 124 contacts a side wall 451 of the upper horizontal frame member 450 to bias the solid panel assembly 6 outwardly away from the upper horizontal structural frame member 450 of the frame assembly 3 in a direction as indicated by arrow K. The panel assembly 6 is biased outwardly by the biasing wire spring member 122 to ensure planar alignment with and aesthetic uniformity between adjacent panel assemblies as mounted on the frame assembly 3 (FIG. 1). As noted above, the biasing wire spring members 122 found on the support members 72 and the positioning assemblies 74, 76 also act to bias the panel assemblies outwardly from the frame assembly 3 to provide an overall uniform appearance for the panel wall system 1 (FIG. 1).

In assembly, and as noted above, the solid panel or skin assembly 6 is positioned with respect to the frame assembly 3 such that the support members 72 engage the longitudinally extending upwardly opening channel 44 of an associated horizontal frame member 12 as shown in FIG. 16. The top edge of the solid panel assembly 6 is then rotated towards the frame assembly 3 such that the upwardly opening hook portions 162 of the spring-loaded top support members 160 engage a portion of an upper horizontal structural member 450 and is thereby plunged downward into the housing portion 168 in a direction indicated by arrow J (FIGS. 21 and 23A). After the panel assembly 6 is in place and the upwardly opening hook portion 162 has cleared the side wall of the horizontal structural member 450, the biasing spring 170 of the spring-loaded top support member 160 urges the upwardly opening hook portion 162 into engagement with the downwardly opening channel 461 of the associated horizontal structural member 450, as shown in FIG. 23A and in phantom in FIG. 23B.

Figure 27B:
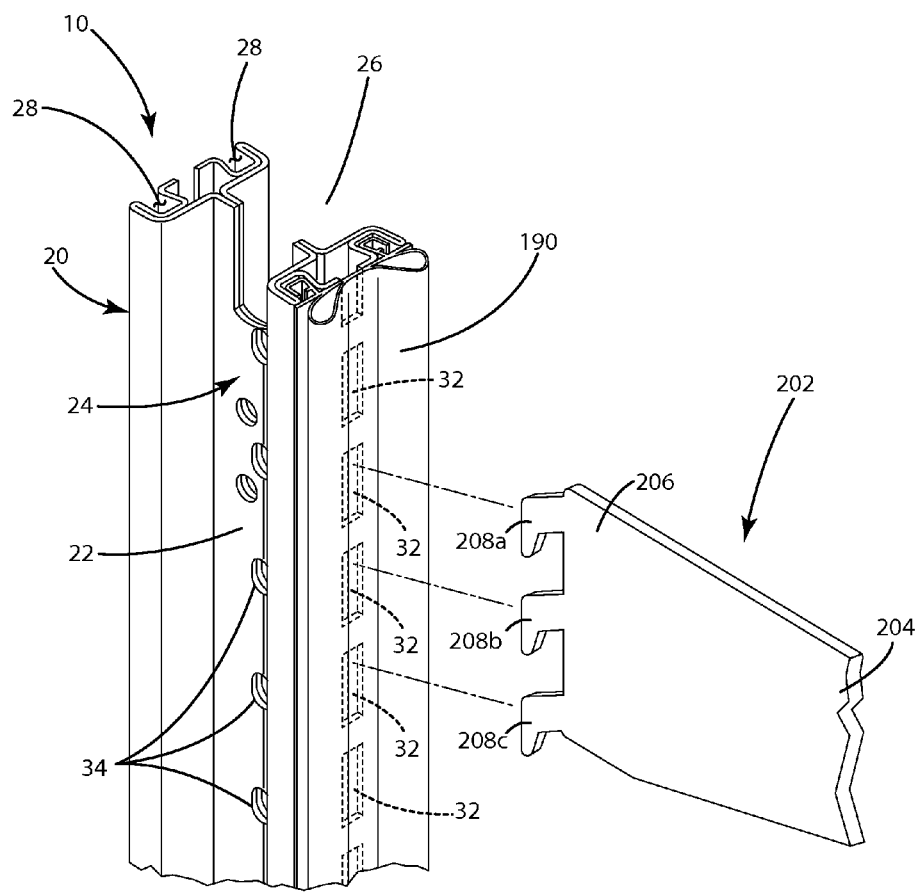
FIG. 27B is a perspective view of an acoustical seal assembly coupled to a vertical frame member with a furniture component exploded away.
Figure 27C:
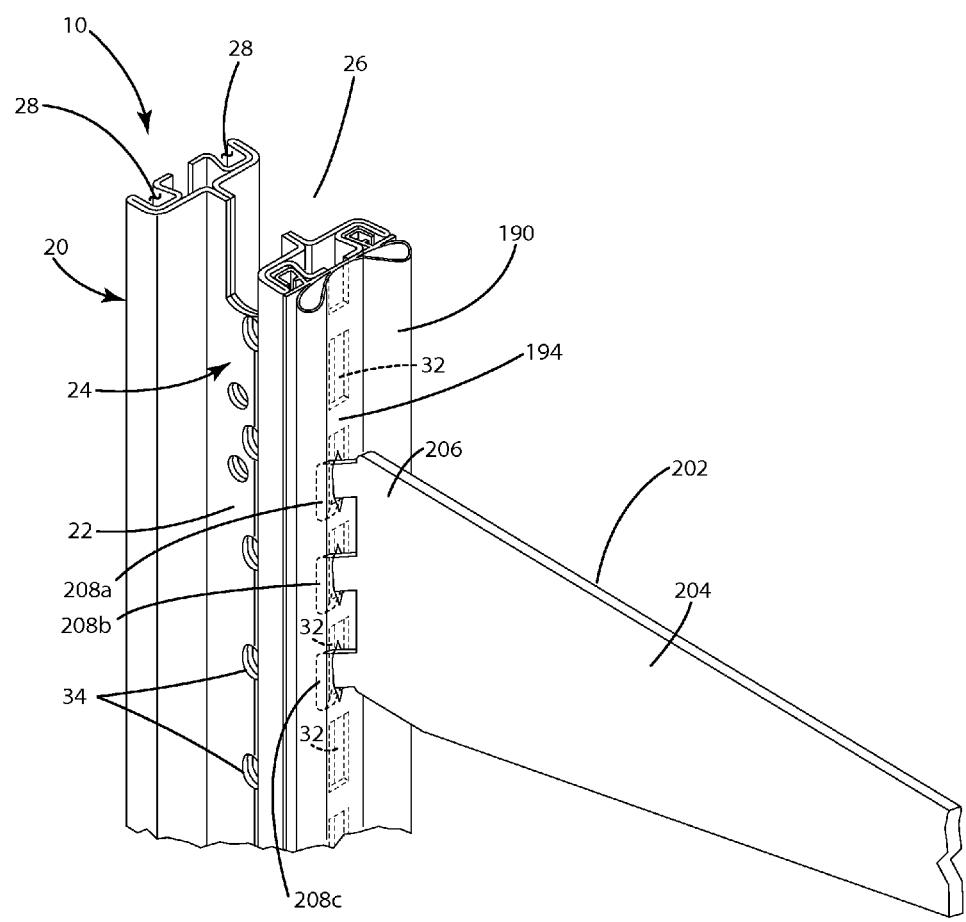
FIG. 27C is a perspective view of the acoustical seal assembly and vertical frame member of FIG. 27B with furniture component extending through the seal assembly to engage the vertical frame member.

The panel wall system 1 further includes a variety of acoustical seal assemblies which help provide privacy and help make for a more soundproof office environment for panel wall system occupants. The variety of acoustical seal assemblies includes acoustical seals 190, shown in FIGS. 24 and 25, which are adapted to couple to the vertical and horizontal frame members 10, 12 in assembly as further described below. Acoustical seal assemblies 190 are configured to form seals between adjacent panel assemblies 6 and the frame assembly 3, such as panel assemblies 6, 6' shown in phantom in FIG. 28. As shown in FIGS. 25 and 26, each acoustical seal assembly 190 includes a generally planar elongate body portion 192 having a central pierceable membrane 194 and a pair of longitudinally and inwardly extending hook-shaped connector portions 196 disposed on a first side of the body portion. The planar body portion 192 also includes landings 198 from which the hook-shaped connector portions 196 inwardly extend. The central pierceable membrane 194 is disposed between and connects the landings 198. The central pierceable membrane 194 is flexibly resilient and pierceable, such that engagement or attachment features (i.e. hooks and other like connectors) of partition wall components can pierce through the central pierceable membrane 194 to engage slots 52 disposed on a slotted channel 50 of an associated horizontal frame member 12 as best shown in FIG. 27A. Similarly, the acoustical seals 190 can be used on vertical frame members 10, thereby providing pierceable access to slots 32 disposed thereon as shown in FIG. 27B. In this way, the acoustical seal assemblies 190 do not need to be removed from an associated frame member (10, 12) when connecting another frame component, or other like accessory, to the associated frame member (10, 12), even if the pierceable membrane 194 is covering necessary engagement features. Thus, as shown in FIGS. 27B and 27C, the pierceable membrane 194 of seal assembly 190 is covering attachment locations or engagement features 32, shown in FIG. 27B as vertically disposed slots or apertures disposed along vertical frame member 10. A furniture component 202 includes a support portion 204 and a mounting portion 206, wherein the mounting portion includes one or more attachment features 208a-208c. As shown in FIG. 27C, the attachment features 208a-208c have pierced through the pierceable membrane 194 of seal assembly 190 to engage engagement features 32. Thus, a portion of the furniture component 202 extends through the pierceable membrane 194 of seal assembly 190. This is a beneficial feature in that the acoustical seal assembly 190 may require the removal of one or more panel assemblies, such as panel assemblies 6, 6' shown in FIG. 28 to be fully removed.

Thus, the acoustical seal assemblies 190 of the present invention having a pierceable membrane 194 that does not have any apertures disposed thereon, until the a furniture component, such as furniture component 202 described above, pierces the membrane 194 to couple to a frame component. As shown in FIG. 28, with the attachment features covered by the pierceable membrane 194, both of which are disposed in and aligned with gap 110 between the adjacent panel assemblies 6, 6', the connecting of another panel wall component is all the more practical. Further, in a partition system, sound can travel through small gaps, such as gaps 110 of the present invention, as well as engagement features, such as slots 32, 52 disposed along frame members 10, 12. The pierceable membrane 194 of the acoustical seal assemblies 190 covers the entirety of the gap 110 between the adjacent panel assemblies 6, 6', and therefore, provides both an aesthetically clean appearance between the panel assemblies 6, 6', and further helps to prevent sound propagation through the panel wall system.

Referring again to FIGS. 27A-28, each hook-shaped connector portion 196 is flexibly resilient and is releasably received within outwardly opening channels, such as channels 28, 48 as found on the frame members 10, 12. The acoustical seal assembly 190 further includes a pair of longitudinally and outwardly extending, loop-shaped seal portions or bulbs 200, which, as shown in FIGS. 25 and 26, are disposed on a second and opposite side of the planar body portion 192 relative to the inwardly extending connector portions 196. Each seal portion 200 is also flexibly resilient to form acoustical seals between frame components and panel assemblies as further described below.

Referring to FIGS. 24-28, the overall makeup of the acoustical seal assembly 190 varies with regards to rigidity and resiliency. The pierceable membrane 194 is flexibly resilient and pierceable, such that the overall acoustical seal assembly 190 can be folded or deformed to aid in the alignment of the hook-shaped connector portions 196 within an associated channel 28, 48 of the frame members 10, 12. The loop-shaped seal portions 200 are also flexibly resilient and similar in makeup as compared to the pierceable membrane 194 to ensure that the seal portions 200 are easily deformed to provide a tight seal between panel assemblies 6 and the frame assembly 3. The landing portions 198 and connector portions 196 are also resilient, but are more rigid as compared to the pierceable membrane 194 and the seal portions 200. In this way, the hook-shaped connector portions 196 allow for a more snap-fit type engagement with the channels 28, 48 of the frame members 10, 12. Thus, the acoustical seal assembly 190 is a one-piece integrally formed acoustical seal assembly having varying degrees of resilience in its component parts. It is further noted that each component part of the acoustical seal assembly 190 runs the length of the acoustical seal assembly 190, but may be trimmed as necessary in assembly.

Regarding the varying makeup of the acoustical seal assemblies 190, it is contemplated that the acoustical seal assemblies 190 can be pultruded or co-extruded polymeric acoustical seals, wherein the acoustical seal assemblies 190 are one-piece integrally formed unitary members have different Shore hardness values with respect to different components of the acoustical seal assemblies. A Shore hardness value or durometer is a measurement of a hardness of a material which is often defined as a materials resistance to permanent indentation. The higher the Shore hardness value or durometer, the more resistant a material is to indentation. The acoustical seal assemblies 190 of the present invention are one-piece integrally formed unitary seal assemblies which exhibit a dual durometer makeup. Thus, the hardness of the different portions of the acoustical seal assemblies 190 exhibit varying hardness values. For example, in one embodiment, the acoustical seal assembly 190 shown in FIG. 25 has an elongate generally planar body portion 192 which includes the pierceable membrane 194. As noted above, the body portion 192 is flexible, so it has a relatively low Shore hardness value with respect to0 other components of the seal assembly. Specifically, in one embodiment, it is contemplated that the outwardly extending connector portions 196 have a first Shore hardness value, whereas the seal portions 200 have a second Shore hardness value. In this embodiment, it is contemplated that the first Shore hardness value is higher than the second Shore hardness value, such that the outwardly extending connector portions 196 are more rigid as compared to the more flexible seal portions 200. In the embodiment shown in FIG. 25, it is contemplated that both the loop-shaped seal portions 200 and the pierceable membrane 194 have a similar Shore hardness value, whereas the outwardly extending connector portions 196 and the landings 198 have a higher Shore hardness value in comparison. Thus, a seal assembly 190 of the present invention has an overall dual durometer makeup.

In assembly, the solid panel assemblies 6, 6', as shown in FIG. 28 are adjacent panel assemblies connected to and supported by a vertical member 10 of the frame assembly 3. During assembly, the seal portions 200 of each of the acoustical seal assemblies 190 are deformed as the inner surface 16 of the panel assemblies 6, 6' contact the seal assemblies 190 as adjacent panels 6, 6' are positioned on the frame assembly 3, thereby acoustically sealing the overall panel wall system 1. In this way, one acoustical seal assembly 190 is able to provide a seal between the frame assembly 3 and two adjacent panel assemblies 6, 6' disposed on either side of the gap 110 formed between the adjacent panel assemblies 6, 6'. In this way, first and second seal portions 200 disposed on a second side of the body portion 190, are adapted to separately engage adjacent panel assemblies 6, 6' about a periphery thereof.

As shown in FIGS. 29-31, the panel wall system 1 further comprises a plurality of end trim members 210 which are adapted to couple to frame members, such as the vertical frame members 10 located on an end run of the panel wall assembly 1, and provide an aesthetic cover thereto. Each end trim member 210 includes a body portion 212 having an inner surface 215 and an outer surface 217. The body portion 212 includes a generally rectangularly-shaped cross-sectional configuration that defines an open channel 214 extending the length thereof, and a pair of longitudinally extending engagement arms 216 disposed on the inner surface 215 as shown in FIG. 30. The arms 216 are adapted to engage a frame member in assembly, thereby releasably securing the end trim member 210 with the frame assembly 3. First and second acoustical seal members 218, 220 are positioned within first and second open ends 222, 224 of the open channel 214, thereby preventing sound or noise from propagating along the open channel 214 into an adjacent section of the panel wall system 1. The first and second open ends 222, 224 are disposed on either side of a middle portion 213 of the channel 214. It is noted that the first and second acoustical seal members 218, 220 may also be configured to be inserted in trim members of varying configurations, such as the angled trim member 211 shown in FIG. 32. Angled trim seal member 218 may further include proud or raised portions 219 that form the seal within the open channel 214 of the end trim member 210. Further, it is contemplated that the acoustical seal assemblies 218, 220 can be die cut foam pieces or malleable foam members which can be compacted for insertion into the open ends 222, 224, and then allowed to expand or resiliently fill the open ends 222, 224 to seal the channel 214. The first and second acoustical seal members 218, 220 provide an acoustic barrier to noises which may be carried to or originate from trim member 210. The configuration of the first and second acoustical seal members 218, 220 allows for the open channel 214 of the end trim member 210 to be accessible at the middle portion 213 for coupling of other frame components thereto. The middle portion is accessible as the acoustical seal assemblies 218, 220 function like plugs on the first and second ends 222, 224 of the open channel 214 of the end trim member 210, and thus do not occupy the entirety of the open channel 214, such as the middle portion 213. It is further contemplated that the middle portion 213 of channel 214 can house an attachment feature for securing a component of the panel wall system thereto.

Figure 33:
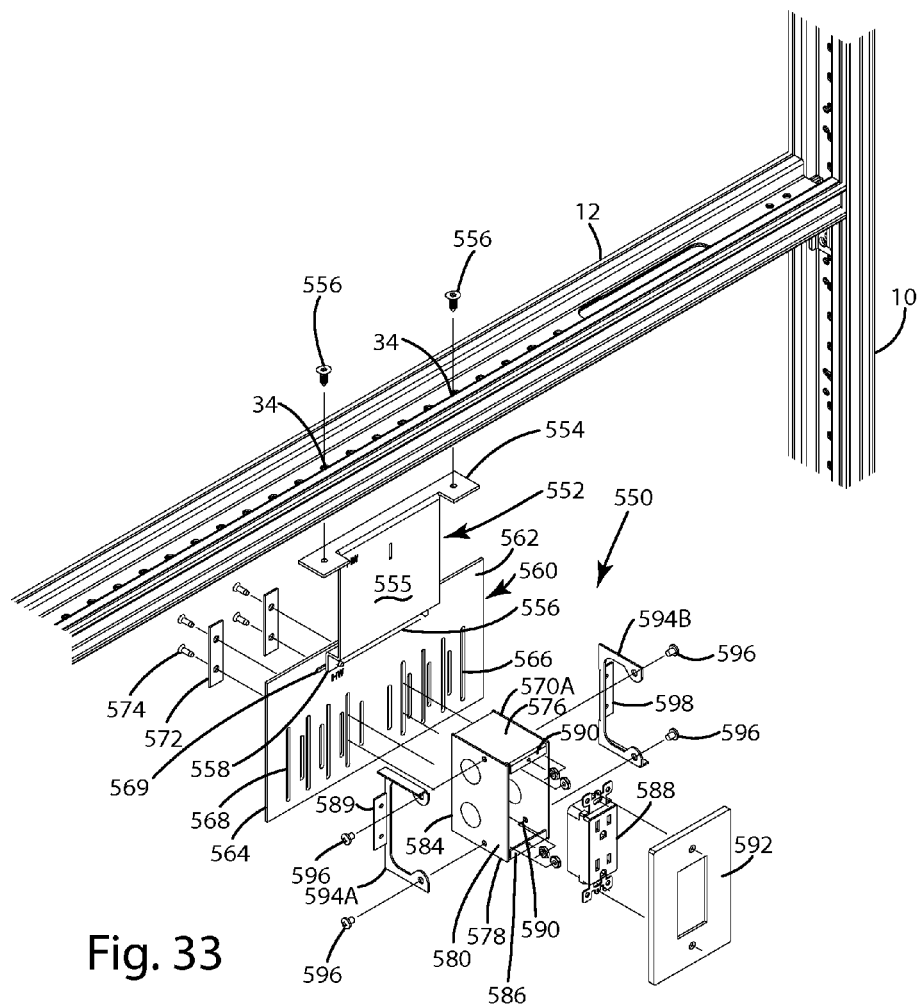
FIG. 33 is an exploded perspective view of an adjustment bracket and gang box.
Figures 34A, 34B, 34C:
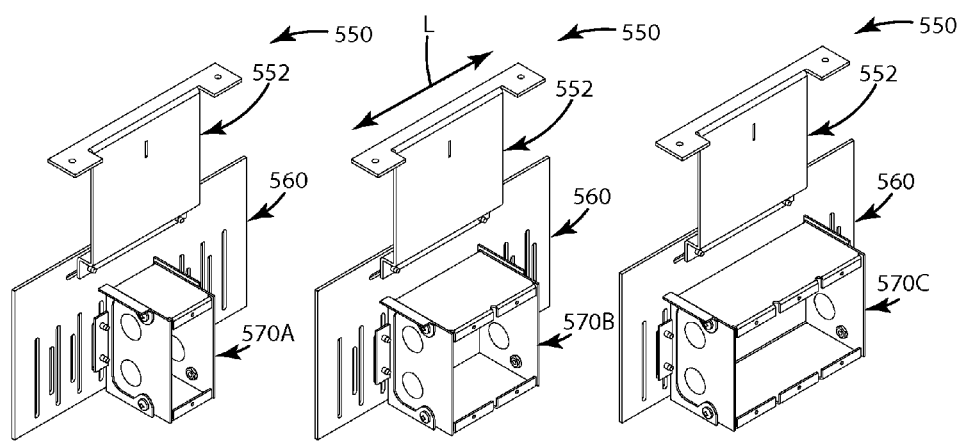
FIGS. 34A-34D are perspective views of an adjustment bracket and associated gang boxes.
Figure 34D:
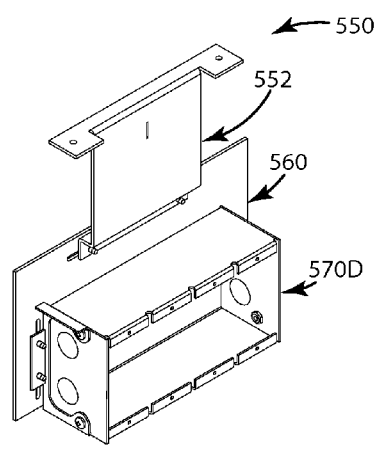

Referring now to FIGS. 33-34D, an electrical box assembly 550 includes an adjustment bracket assembly 552 having a body portion and upper and lower bracket portions 554, 558. Upper bracket portion 554 is adapted to couple to a horizontal frame member 12 using fasteners 556 shown in FIG. 33. The lower bracket portion 558 couples to an adapter bracket 560. The adapter bracket 560 supports multiple sizes of electrical and data boxes, such as gang boxes 570A-570D. As shown in FIG. 33, a single gang box 570A is coupled to the adapter bracket 560 using brackets 572 and fasteners 574. In this way, the single gang box 570a is adapted to couple to an outwardly facing surface 562 of the adapter bracket 560 with brackets and fasteners 572, 574 being disposed on an inwardly facing surface 564 of the adapter bracket 560. As further shown in FIG. 33, the single gang box 570A includes top and bottom surfaces 576, 578, side wall surfaces 580, 582 and a rear wall surface 584 to define a cavity 586. In assembly, the cavity portion 586 of the gang box 570A is adapted to support and house an electrical or data receptacle which, in FIG. 33, is shown as receptacle 588. The receptacle 588 couples to attachment flanges 590 disposed at upper and lower portions of the opening into the cavity 586. Further, a cover member 592 is disposed over the receptacle 588 and further couples to attachment flanges 590. As further shown in FIG. 33, U-shaped mounting brackets 594A, 594B are fastened to the sidewalls 580, 582 using fasteners 596. U-shaped mounting brackets 594A and 594B further include attachment flanges 598 which, in assembly, align with brackets 572 for coupling to the adapter bracket 560. In this way, the attachment flanges 598 are disposed on the outer facing surface 564 of the adapter bracket 560 and the attachment brackets 572 are disposed on the inner facing surface 564 of adapter bracket 560 in assembly. As further shown in FIG. 33, the adapter bracket 560 includes a plurality of vertical slots 566 disposed along a length thereof, such that the adapter bracket 560 can support varying sizes of electrical boxes as shown in FIGS. 34A-34D.

The adapter bracket 560 further includes a generally horizontal slot 569 which is disposed above vertical slots 566, such that the lower bracket portion 556 of the adjustment bracket assembly 552 can allow for the adapter bracket 560 to move laterally in a direction as indicated by arrow L (FIG. 34B) to meet specific configuration requirements of a particular system.

As shown in FIGS. 34A-34D, the adjustment bracket assembly 552 is adapted to support a single gang box 570A, a double gang box 570B, a triple gang box 570C, and a quadruple gang box 570D. The varying sizes of the gang boxes 570A-570D are supported on the vertical slots 566 of the adapter bracket 560. Thus, the mounting flanges 594A and 594B, as shown in FIG. 33, engage various vertical slots 566 as necessary to support an electrical gang box of a particular size. Further, it is contemplated that a smaller gang box, such as gang box 570A, can be disposed anywhere along the length of the adapter bracket 560 to accommodate a specific design requirement. In this way, the adjustable back assembly 12 can be adjusted by moving the adapter bracket 560 laterally within slot 569 as indicated by arrow K (FIG. 34B), and further, the electrical gang box, such as gang box 570A, can be positioned anywhere laterally across the body of the adapter bracket 560, thereby providing a multi-positional adjustment bracket assembly 552.

Figure 35:
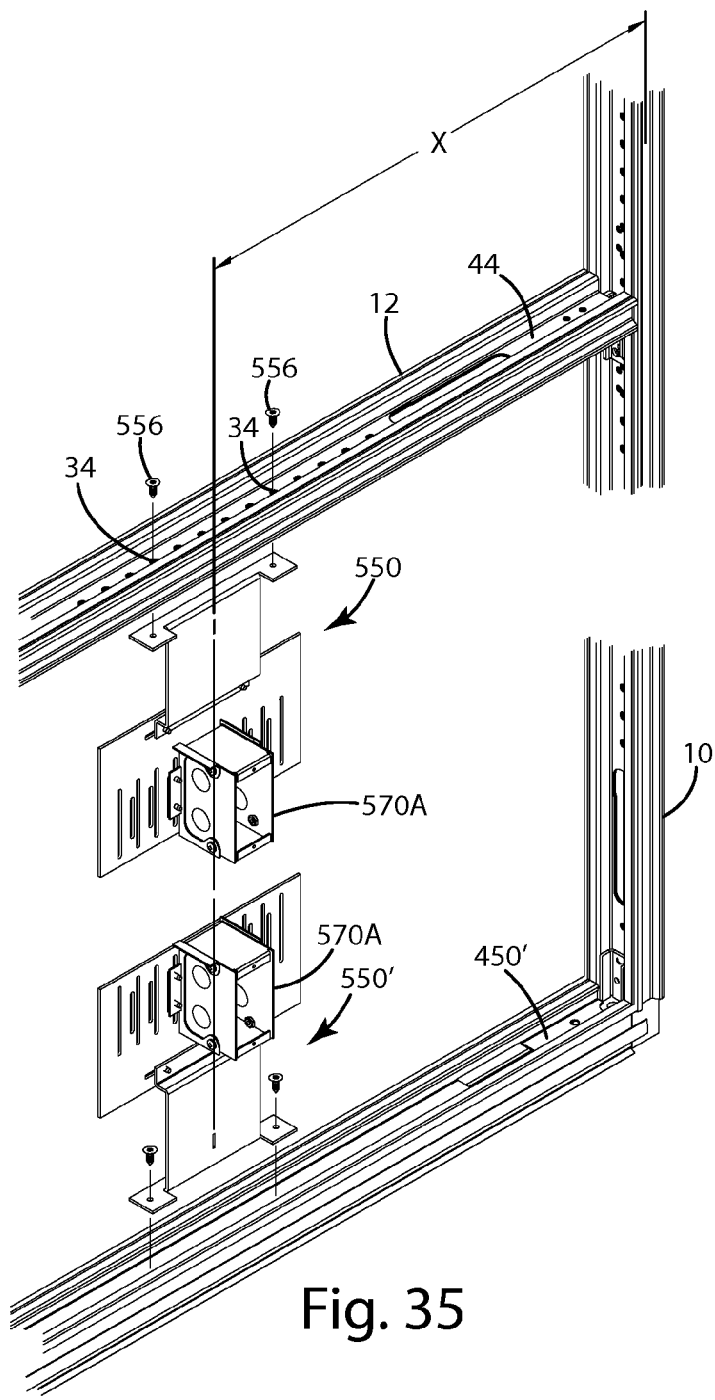
FIG. 35 is a fragmentary perspective view of adjustment brackets positioned to be mounted to a frame assembly.

Referring now to FIG. 35, a first electrical box assembly 550 is shown coupled to a horizontal frame member 12, with a second adjustment bracket assembly 550' coupled to a lower horizontal structural member 450'. Thus, as shown in FIG. 35, the electrical box assembly 550 can be coupled to a horizontal frame member 12 using fasteners 556 disposed through apertures 34 which are spaced along upwardly opening channel 44 of the horizontal frame member 12. As shown in FIG. 35, the first electrical box assembly 550 is spaced along horizontal frame member 12 a distance X from vertical frame member 10. Electrical box assembly 550' is positioned within an upwardly opening channel of structural horizontal member 450', such that the electrical box assembly 550' supports gang box 570A above the structural horizontal member 450'.

Figure 36A:
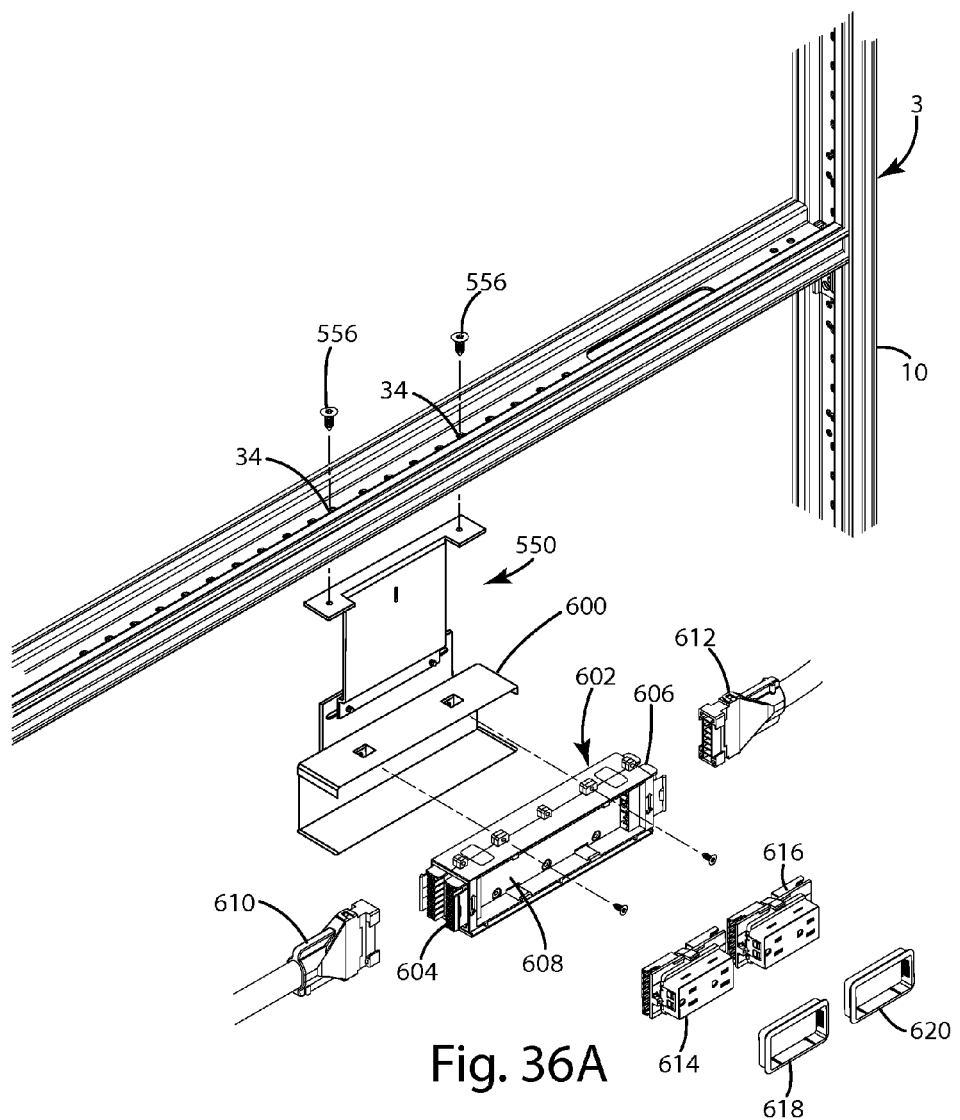
FIG. 36A is an exploded perspective view of an adjustment bracket and power block.
Figure 36B:
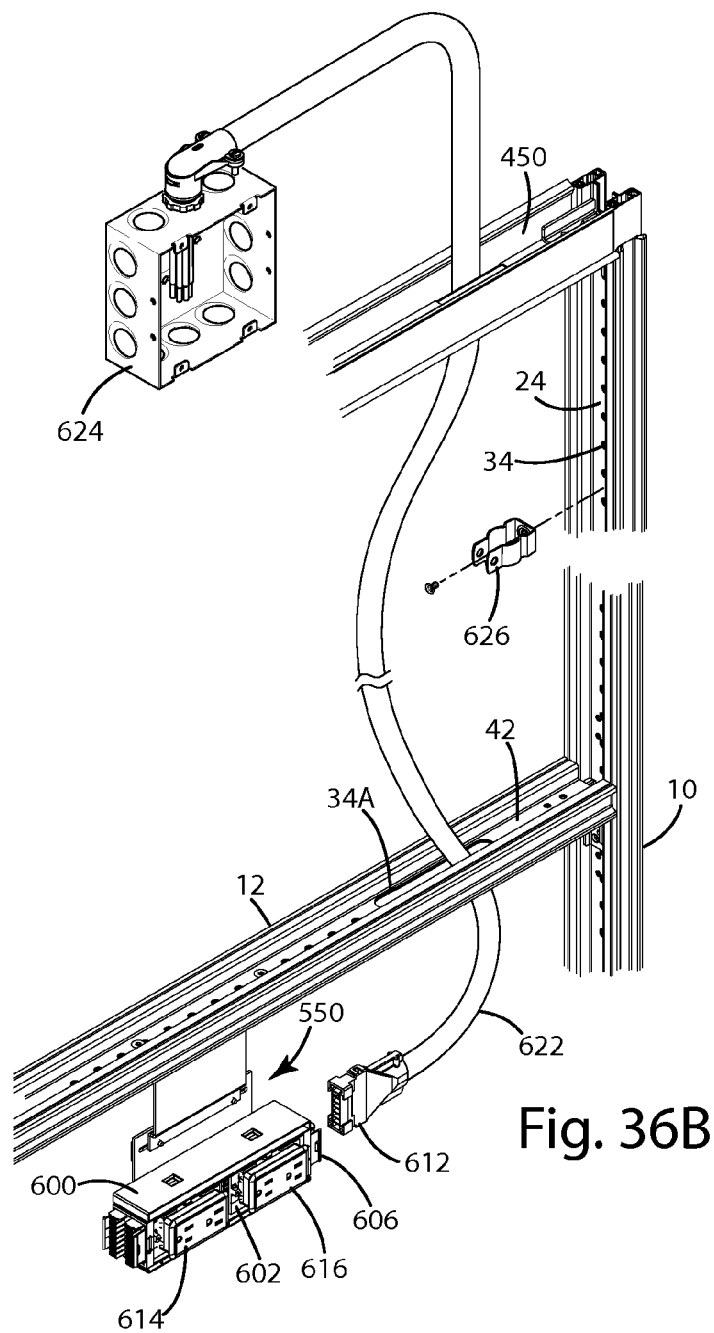
FIG. 36B is a fragmentary perspective view of the power block of FIG. 36A connected to a junction box disposed on a frame assembly.

Referring now to FIGS. 36A, 36B, the electrical box assembly 550 is shown supporting a power block bracket 600 which is adapted to receive a power block 602. The power block 602 includes first and second ports 604, 606 which are adapted to couple to first and second harness connectors 610, 612 for providing power to the power block 602. The power block 602 further includes a cavity portion 608 disposed between outer ports 604, 606. In assembly, receptacles 614, 616 are adapted to couple to ports 604 and 606 within the cavity portion 608 of the power block 602 as shown in FIG. 36B. Cover assemblies 618, 620 are adapted to cover receptacles 614, 616 as received within the cavity portion 608 of the power block 602. It is contemplated that the cover assemblies 618, 620 may be disposed between the receptacles 614, 616 and a solid panel assembly as supported on the frame assembly 3. As shown in FIG. 36B, the power block 602 is received within the power block bracket 600 and harness connector 612 is shown being coupled to outside port 606. In the embodiment shown in FIG. 36B, the harness connector 612 is coupled to a hardwire assembly 622 which is adapted to feed through aperture 34A disposed through body portion 42 of the horizontal frame member 12. The hardwire assembly 622 is further shown disposed through an upper horizontal structural member 450, such that the hard wire assembly 622 is a conduit to junction box 624. A strain relief bracket 626 is adapted to couple to the hardwire assembly 622 and further couple to outwardly opening channel 24 of the vertical frame member 10 through an attachment aperture 34. In this way, the strain relief bracket 626 can support the weight of the hardwire assembly 622 as necessary for a specific design configuration.

Figure 37:
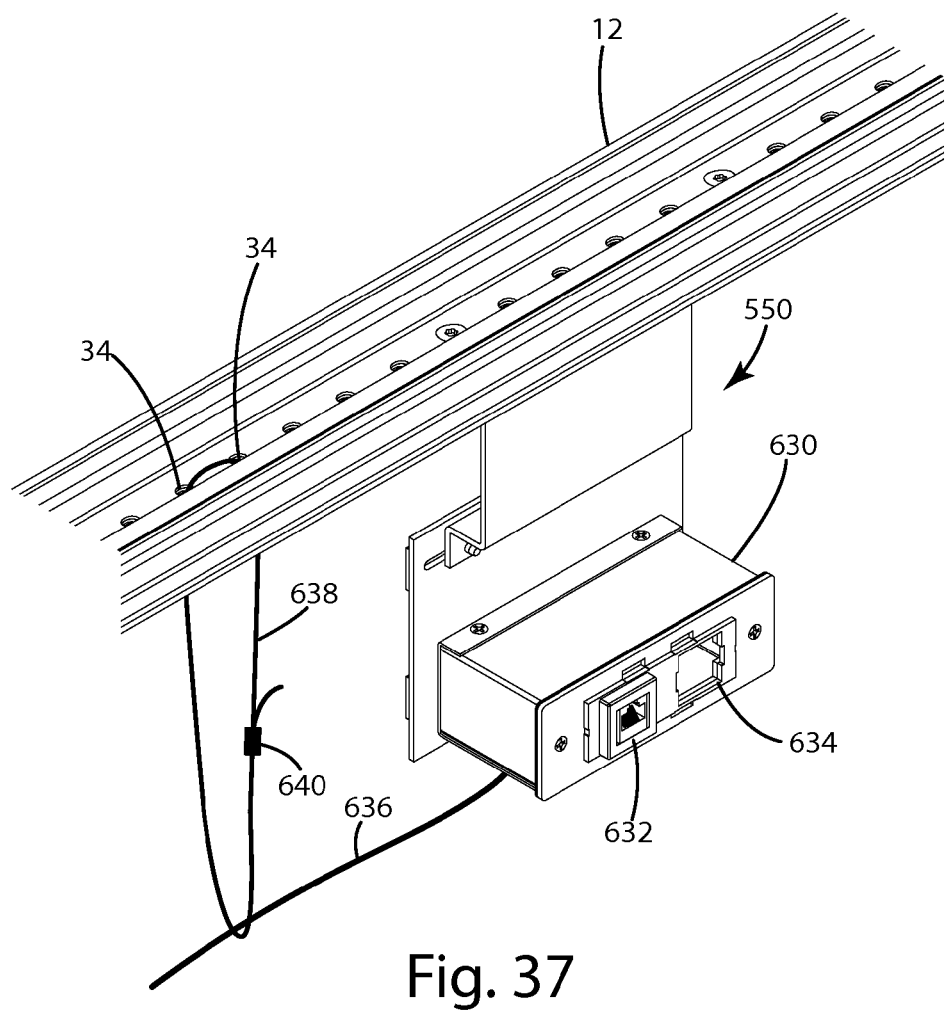
FIG. 37 is a perspective view of an adjustment bracket and data receptacle coupled to a frame assembly.

Referring now to FIG. 37, the electrical box assembly 550 is shown supporting a data block 630 having data receptacle 632 received in apertures 634. A data cable 636 is coupled to data block 630 to provide data and power to data receptacle 632. A cable tie assembly 638 is used to support the data cable 636 with an interior of the frame assembly 3. In the embodiment shown in FIG. 37, the cable tie 638 is a general loop-shaped cable tie that is disposed around data cable 636 and through adjacent apertures 34 disposed on horizontal frame member 12. A connector clip 640 is used to adjust the size of the cable tie 638 to properly support the data cable 636 in a configuration necessary for a specific design layout.

Figures 38, 39:
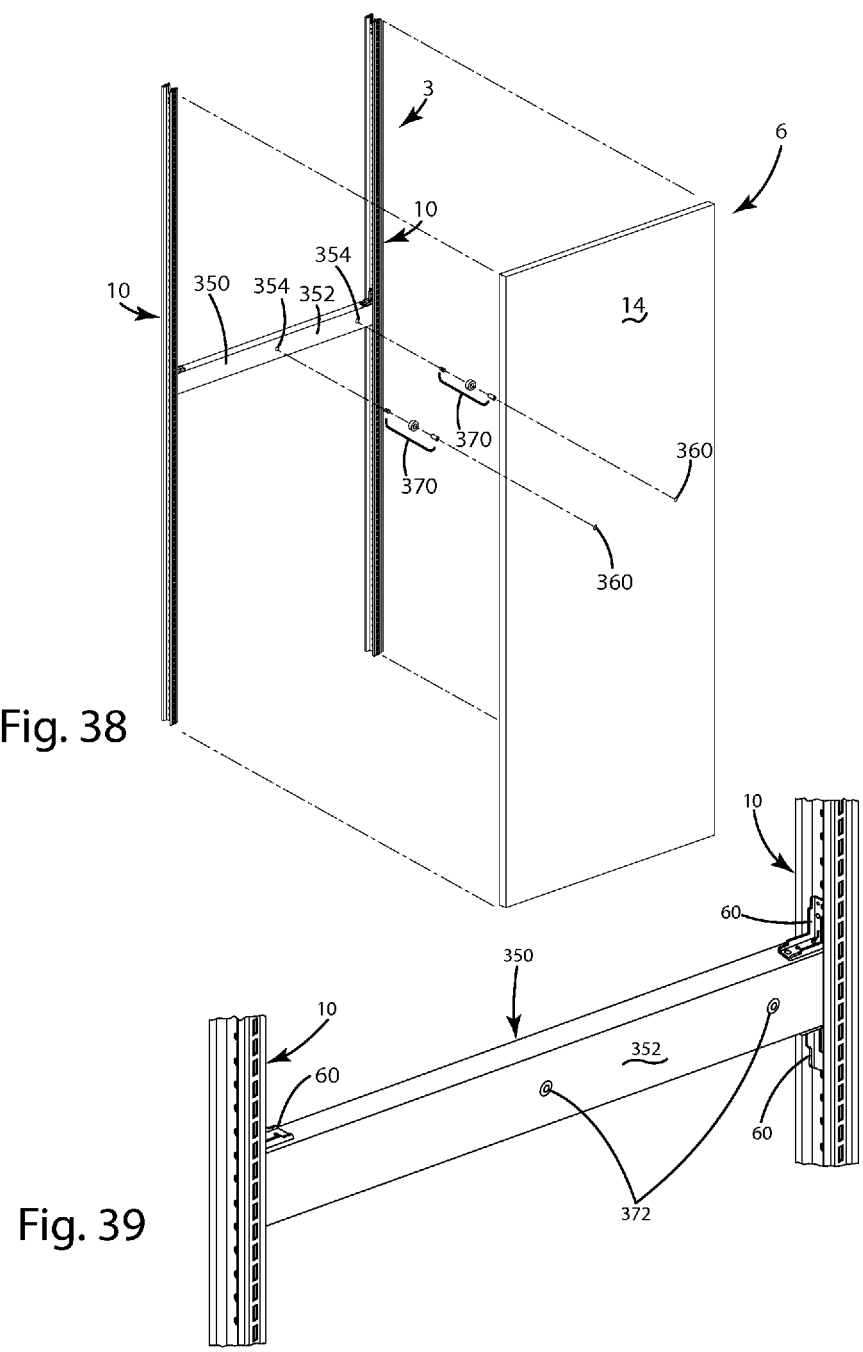
FIG. 38 is an exploded view of a frame assembly having a structural reinforcement member mounting assembly and a panel assembly.
FIG. 39 is a perspective view of a structural reinforcement member having parts of mounting assemblies coupled thereto.
Figure 40:
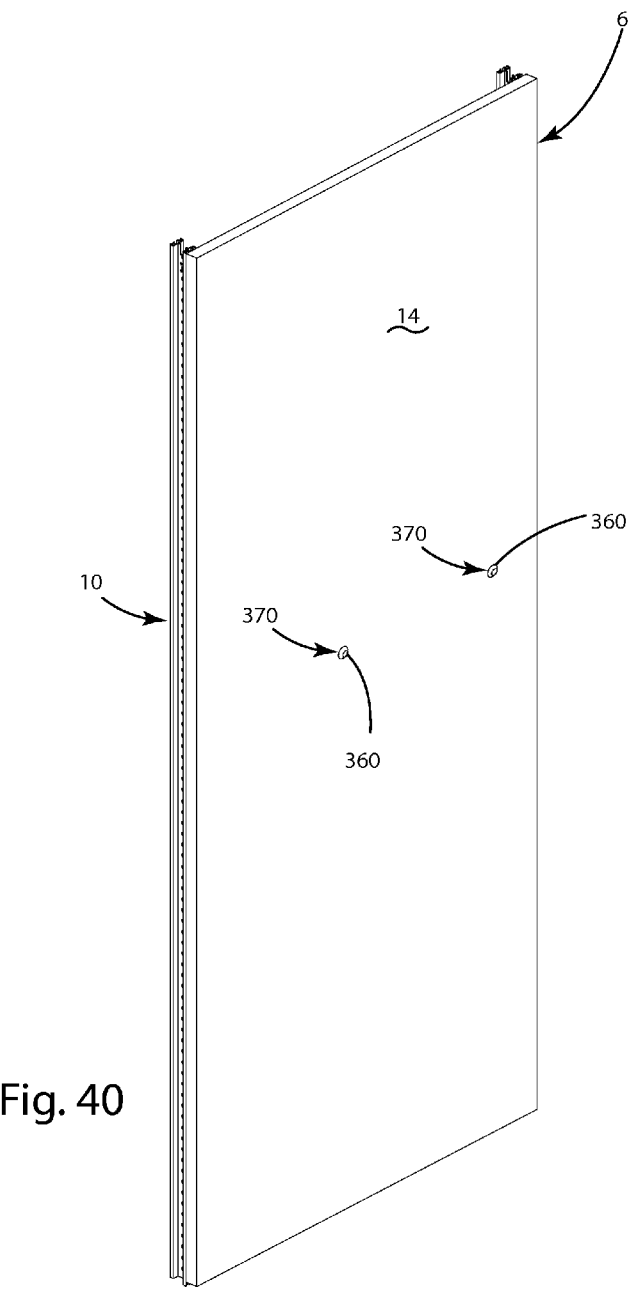
FIG. 40 is a perspective view of a panel assembly having mounting assemblies disposed thereon.

The panel wall system 1 further includes an optional structural reinforcement horizontal frame member 350 which can be used to support wall panel components off of the frame assembly 3 as further described below. As shown in FIG. 38, a solid panel or skin assembly 6 is exploded away from two opposite and spaced apart vertical frame members 10, wherein a structural reinforcement horizontal frame member 350 is coupled to and disposed between vertical frame members 10. The structural reinforcement horizontal frame member 350 is coupled to and disposed between vertical frame members 10 by L-shaped brackets 60 disposed on upper and lower sides of the structural reinforcement horizontal member 10 to ensure a rigid engagement with the frame assembly 3. L-shaped brackets 60 are similar to those discussed above with reference to FIG. 6. As shown in FIGS. 38 and 39 the reinforcement horizontal frame member 350 includes a plurality of mounting assemblies 370 which couple to a body portion 352 of the horizontal frame member 350 and are further disposed in holes 360 cut through the skin assembly 6 and through the aesthetic outer surface 14 as shown in FIG. 40. In this way, accessories, such as cabinets, do not need to be directly mounted to the skin assembly 6, but rather can be mounted to a brace kit comprising the horizontal reinforcement member 350 and mounting assemblies 370, such that the frame assembly 3 carries the load.

As shown in FIGS. 41 and 42, each mounting assembly 370 includes a rivet nut 372, a cylindrical spacer 374, such as an aluminum spacer, and a foam ring 376. In assembly, the rivet nut 372 is installed into holes 354 cut in the body portion 352 of the structural reinforcement member 350 as shown in FIG. 38 and then crimped into place as shown in FIG. 39. The spacer 374 is inserted into a foam ring 376 and the foam ring 376 is then inserted into holes 360 of the skin assembly 6, such that the spacer 374 and foam ring 376 align with the rivet nut 372 in assembly. The foam ring 376 plugs the holes 360 in the skin assembly 6 for blocking sound and light transmission as shown in FIG. 40.

With the skin assembly 6 in place on the frame assembly 3 as shown in FIG. 40, an accessory, such as a cabinet 380, shown in phantom in FIG. 43, can be coupled to the partition system using mounting assemblies 370. When mounting an item such as a cabinet, multiple reinforcement horizontal members 350, 350' may be required. As shown in FIG. 43, a cabinet assembly 380 is mounted to the mounting assemblies 370 disposed on upper and lower structural reinforcement horizontal members 350 via fasteners 382, such that the cabinet 380 is spaced apart from the reinforcement horizontal member 350 by spacers 374, thereby allow room for the skin assembly 6. In this way, the load of the cabinet 380 is tied into the reinforcement horizontal member 350 and the frame assembly 3, and therefore does not carry to the skin assembly 6.

Figure 44:
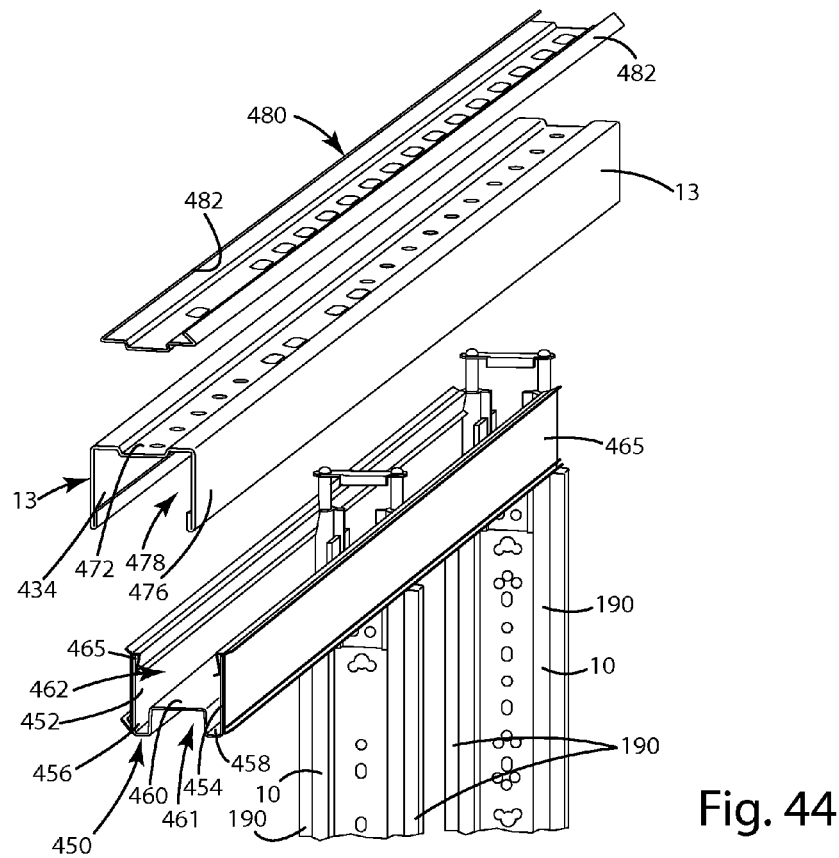
FIG. 44 is an exploded perspective view of an upper portion of a panel wall assembly.

Referring now to FIG. 44, vertical frame members 10 of the frame assembly 3 are shown supporting a structural horizontal member 450 which is adapted to couple to a ceiling track 13. The structural horizontal member 450 includes a first side 452 and a second side 454 having upwardly opening channels 456 and 458 disposed on either side of a body portion 460. In the cross section, the structural horizontal member 450 has an upwardly opening channel 462 disposed above the body portion 460, and a downwardly opening channel 461 disposed below the body portion 460. The ceiling track 13 includes a body portion 472 and first and second sides 474, 476 disposed on either side of the body portion 472 to define a downwardly opening "C" channel 478. In assembly, first and second sides 474, 476 are received within the upwardly opening channels 456 and 458 of the structural horizontal member 450. The structural horizontal member 450 is adapted to receive seal strips 465 as coupled to the first and second sides 452, 454 of the structural horizontal member 450. The ceiling track 13 further includes a seal 480 which is adapted to coupled to the body portion 472 of the ceiling track 13, and further includes outwardly extending resiliently flexible seal portions 482 which are adapted to create a seal between the ceiling track 14 and a ceiling surface in assembly.

Figures 45A, 45B:
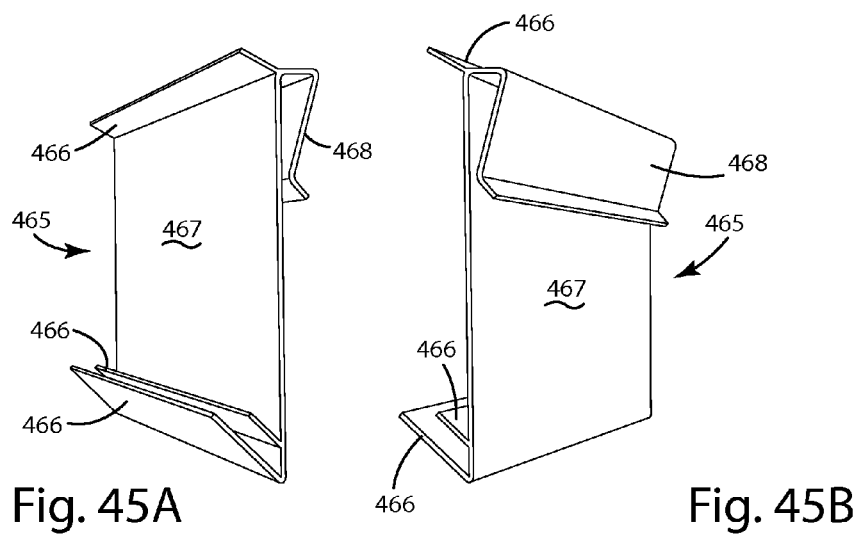
FIGS. 45A-45B are perspective views of an acoustical seal strip.
Figure 46:
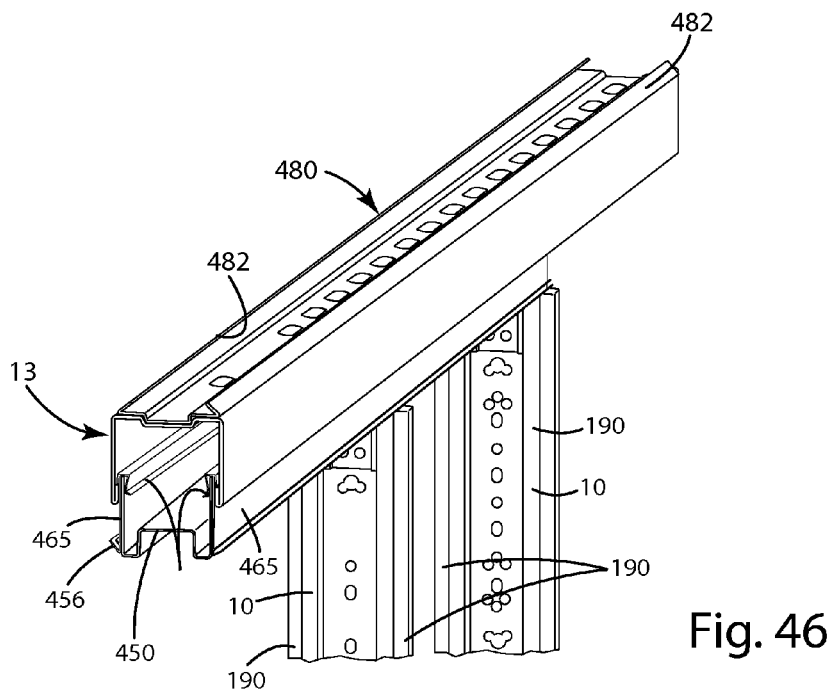
FIG. 46 is a perspective view of an upper portion of a panel wall assembly.

As shown in FIGS. 45A and 45B, the sealing strips 465 include a body portion 467 having outwardly extending sweep portions 466 disposed on the upper and lower portions of the body 467. A hook-shaped member 468 is disposed on the upper end of the body portion 467 on the opposite sides of the sweeps 466, wherein the hook shaped member 468 is adapted to couple to the first and second sides 452, 454 of the structural horizontal member 450 as shown in FIG. 44. In assembly, and as shown in FIG. 46, the upper sweep 466 of sealing strip 465 forms a seal between the structural horizontal member 450 and the ceiling track 13. The lower sweeps 466 of the sealing strips 465 are adapted to form seals between the structural horizontal member 450 and panel assemblies 6 as coupled to the frame assembly 3.

Figure 47:
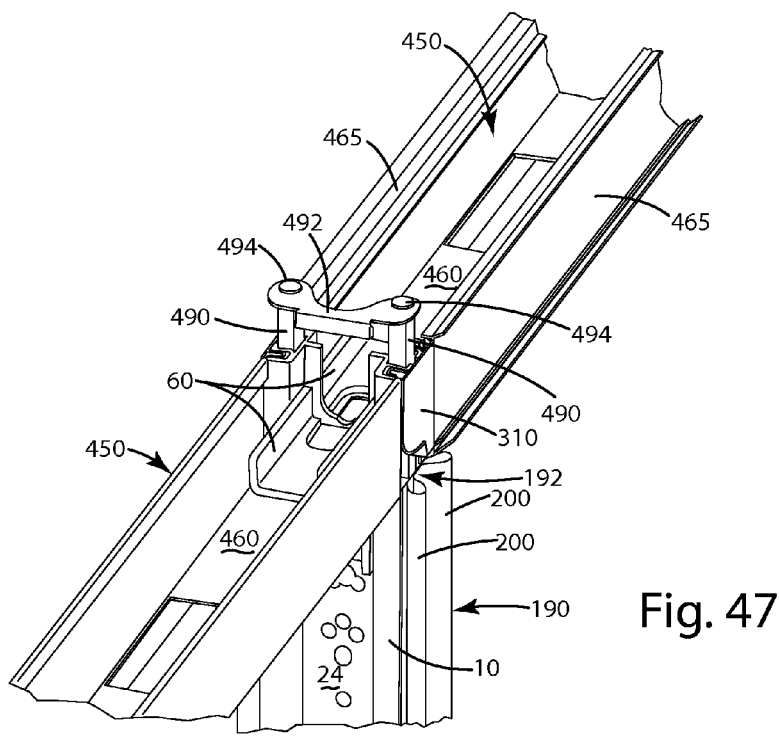
FIG. 47-48 are perspective views of a post extension system.
Figure 48:
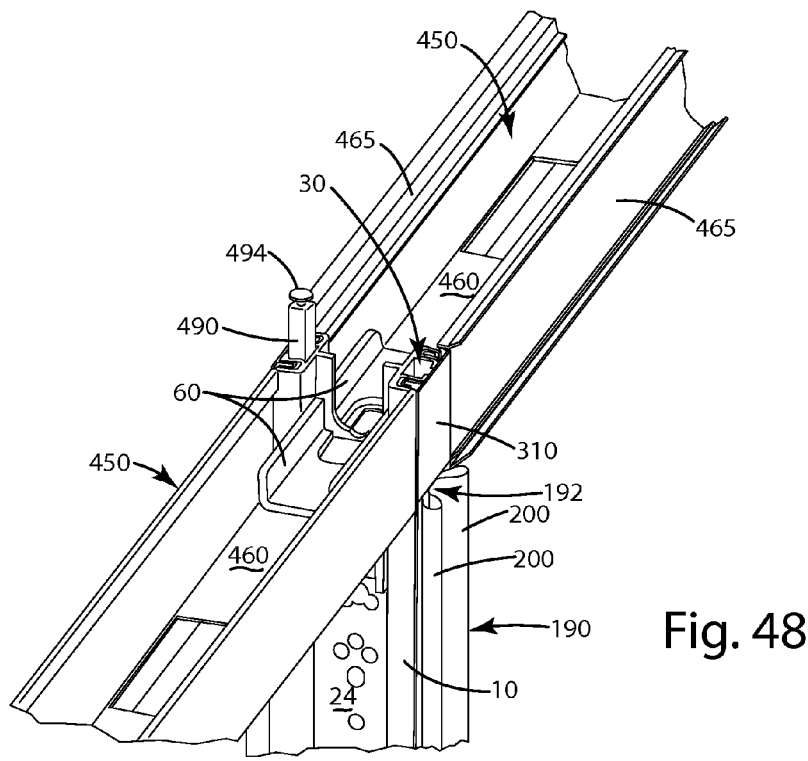

As shown in FIGS. 47 and 48, the vertical frame members 10 include a post extension system having post extensions 490 telescopingly received within slotted channels 30 of the vertical frame members 10. The post extensions 490 are telescopingly received within the slotted channel 30 such that the post extensions 490 can be vertically adjusted to account for variations in a ceiling surface in a building space. The post extensions 490 are coupled to one another via a bracket 492 using fasteners 494. In assembly, the bracket 492 and the fasteners 494 abut the ceiling track 13 along the body portion 472 of the ceiling track 13. As shown in FIG. 47, the horizontal structural member 450 is coupled to the vertical frame members 10 via "L" shaped brackets 60, which are similar to the "L" shaped brackets 60 shown in FIGS. 6 and 24. Thus, in assembly, the "L" shaped brackets 60 couple to the body portion 460 of the structural horizontal member 450 and also coupled to the channel 24, at a body portion 22, of the vertical frame members 10. As further shown in FIGS. 47 and 48, the acoustical seal 190 disposed on vertical frame member 10 includes looped-shaped sealing portions 200 for sealing against panel assemblies as attached to the frame assembly 3.

As further shown in FIG. 48, the vertical frame member 10 is illustrated supporting two adjacent horizontal structural members 450. The acoustical seal 190 is coupled to the vertical frame member 10 and abuts the bottom of the associated adjacent horizontal structural members 450. In the illustrated example, the acoustical seal 190 does not extend to an upper edge of the adjacent horizontal structural members 450. The exposed surfaces of the adjacent horizontal structural members 450 are adapted to be hidden by ceiling track covers 13 as shown in FIG. 46. However, because of the overall construction of the frame assembly 12, these ceiling track covers 13 may not abut one another, thereby leaving a gap there between which exposes portions of the horizontal structural members 450 located above the acoustical seal 190. In order to mask any gaps between the adjacent horizontal structural members 450 or the ceiling track covers 13, an adhesive patch 310 is placed in the position adjacent to the vertical frame member 10 and above acoustical seal 190, thereby aesthetically covering the portion of the horizontal structural members 450 which the acoustical seal 190 does not cover. It is noted that the adhesive patch 310 may be color coded to match the acoustical seal 190, the ceiling track covers 13, the adjacent horizontal structural members 450 or a combination thereof. The color coding may include line features that match the specific configuration of a horizontal structural member 450, or another similar component, to provide a seamless appearance to the adhesive patch 310 as applied to the system.

Figure 49:
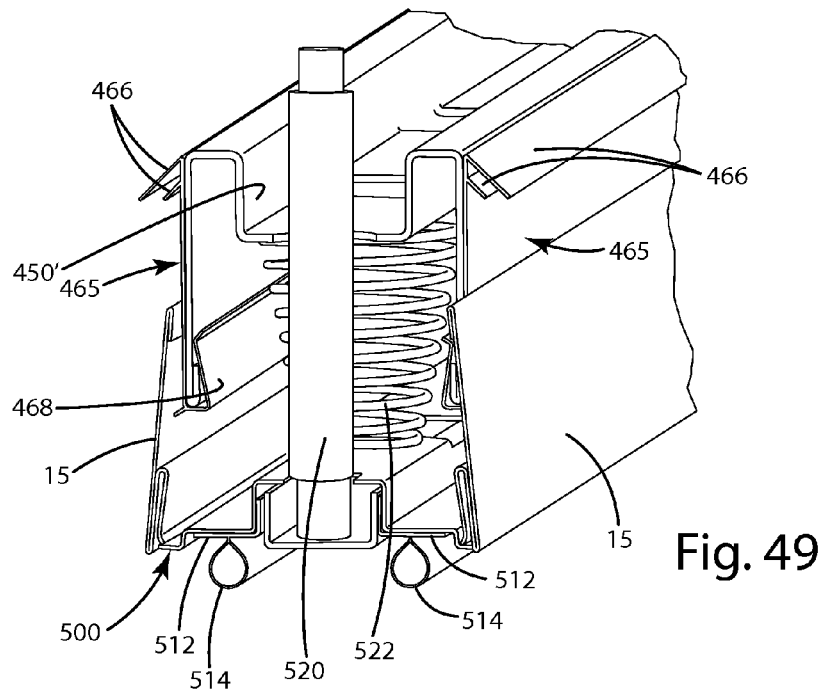
FIG. 49 is a perspective view of a lower portion of a panel wall assembly.
Figure 50:
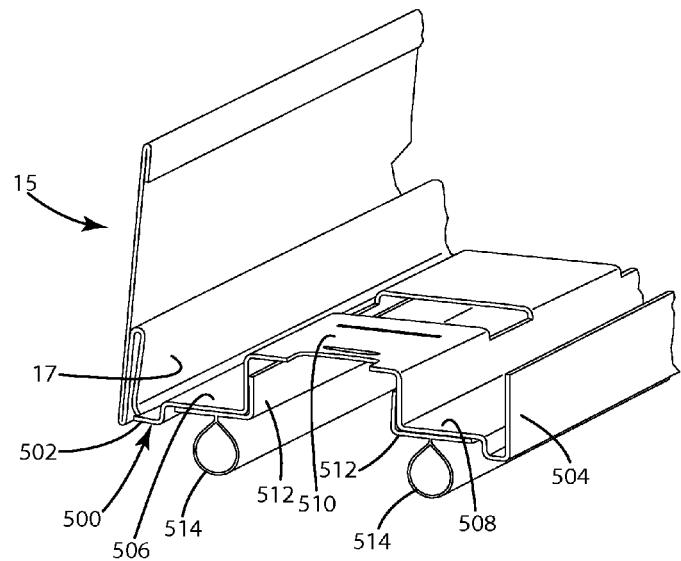
FIG. 50 is a perspective view of an base track assembly and cover member.
Figure 51:
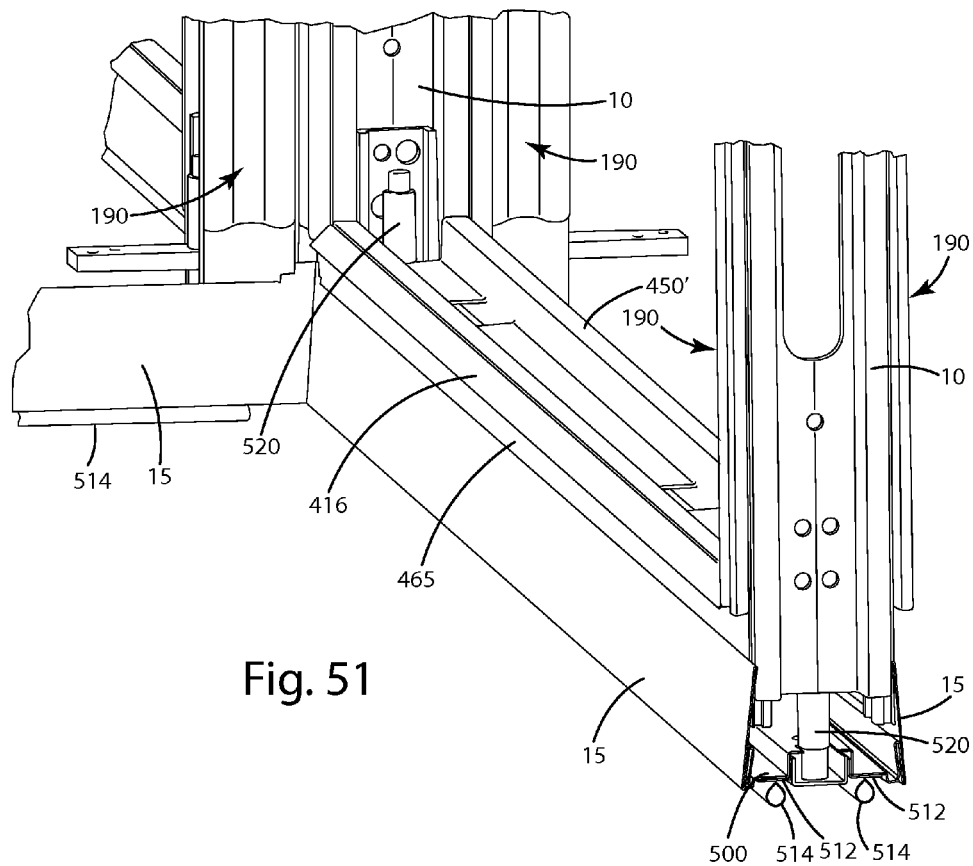
FIG. 51 is a perspective view of a lower portion of a panel wall assembly.

Referring now to FIGS. 49-51, the panel wall system 1 further includes a structural horizontal member 450' disposed along a lower portion of the panel wall assembly, wherein the structural horizontal member 450' is the same in configuration as the structural horizontal member 450 coupled to the ceiling track 13. At the lower portion of the panel wall assembly 1, the structural horizontal member 450' is in a reverse orientation as compared to the structural horizontal member 450 coupled to the ceiling track 13. The structural horizontal member 450' includes sealing strips 465 coupled thereto in a similar fashion in regards to structural horizontal member 450. In assembly, the sealing strips 465 include upper sweeps 466 which are adapted to seal between the structural horizontal member 450' and panel assemblies as coupled to the panel wall system. Covers 15 are disposed on either side of the structural horizontal member 450' and, in assembly, are coupled to a base track 500. As best shown in FIG. 50, the covers 15 include a hook-shaped portion 17 which is adapted to engage the base track 500. The base track 500 includes first and second sides 502, 504 which couple to the hook-shaped portions 17 of the covers 15. The base track 500 further includes planar portions 506, 508 disposed about opposite sides of a central channel 510. Sealing strips 512 are disposed near the planar portions 506, 508 of the base track 500 and include looped-shaped portions 514 adapted to form a seal between the base track 500 and a floor surface 4. Referring again to FIG. 49, a telescoping vertical adjustment member 520 is coupled to the base track 500 and is adapted to make vertical adjustments of the panel wall system to account for uneven areas of a floor surface. As shown in FIG. 49, a spring member 522 is disposed between the structural horizontal member 450' and the base track 500 thereby biasing the structural horizontal member 450' in an upwardly direction from the base track 500. In assembly, the telescoping vertical adjustment member 520 is coupled to the horizontal frame members 10 using "L" shaped brackets 60 in a similar manner as noted above. As shown in FIG. 51, the structural horizontal member 450' is disposed between vertical frame members 10 wherein each vertical frame member 10 includes a telescoping vertical adjustment assembly 520 coupled to the base track 500 for vertical adjustment of the frame assembly 3.

Figure 52:
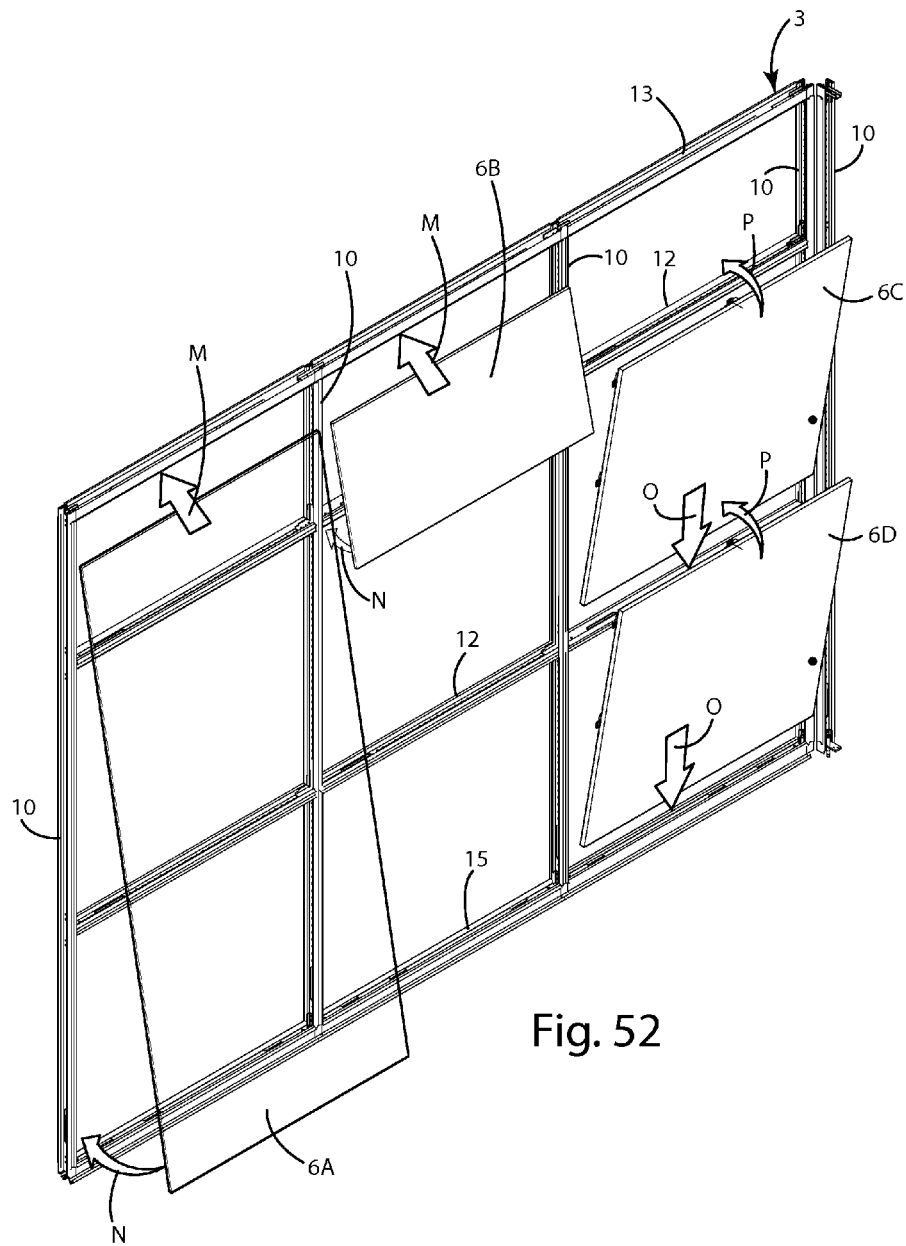
FIG. 52 is a perspective view of a frame assembly and panel assemblies as positioned in a panel wall assembly.

Referring now to FIG. 52, a frame assembly 3 is shown supporting a variety of panel assemblies 6A-6D thereon. Panel 6A is a monolithic panel which is adapted to couple to the ceiling track 13 and the base assembly 15 to cover the frame assembly 3 along an entire vertical length thereof. Panel 6B is a top skin assembly while panel assemblies 6C and 6D are intermediate and bottom panel assemblies respectively. As shown in FIG. 52, the monolithic panel assembly 6A is positioned on the frame assembly 3 by first moving a top edge of the panel assembly 6A towards the ceiling track 13 in a direction indicated by arrow M for engagement of an attachment feature, such as a spring loaded top support member 160 described above with reference to FIGS. 23A and 23B. The bottom edge of the monolithic panel assembly 6A is then rotated towards the base assembly 15 of the frame assembly 3 in a direction as indicated by arrow N. Once in position, the monolithic panel 6A will then move downward to engage the base assembly 15 using an attachment feature, such as one or more support members 72 as described above with reference to FIGS. 15 and 16. Similarly, the top panel assembly 6B is moved towards the ceiling track 13 in a direction that is indicated by arrow M and the rotated towards the frame assembly 3 in a direction as indicated by arrow N. The intermediate panel assembly 6C and bottom panel assembly 6D are adapted to couple to the frame assembly 3 in a different manner. The panel assemblies 6C, 6D are first positioned such that an engagement feature, such as a support member 72, will engage frame member 12 through a downward movement in the direction indicated by arrow 0. Once the bottom edges of the panel assemblies 6C, 6D are positioned on the horizontal frame members 12 or base assembly 15, the panel assemblies 6C, 6D are then rotated toward the frame assembly 3 in a direction as indicated by arrow P. Once in position, the panel assemblies 6A-6D are locked into place using latch mechanisms 70 as shown and described above with reference to FIGS. 7-10.

Figure 53:
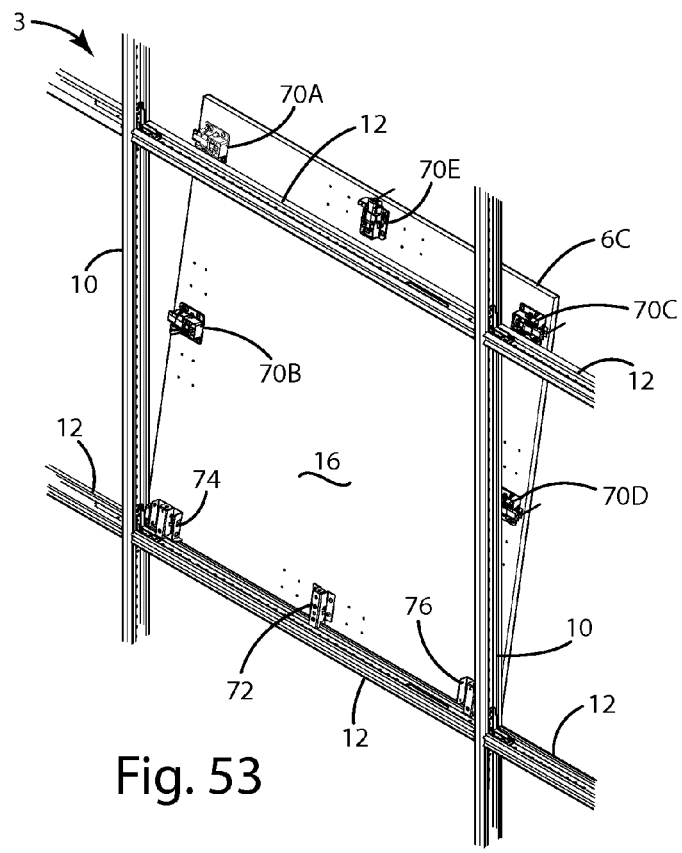
FIG. 53 is a fragmentary perspective view of a panel assembly positioned on a frame assembly.
Figure 54:
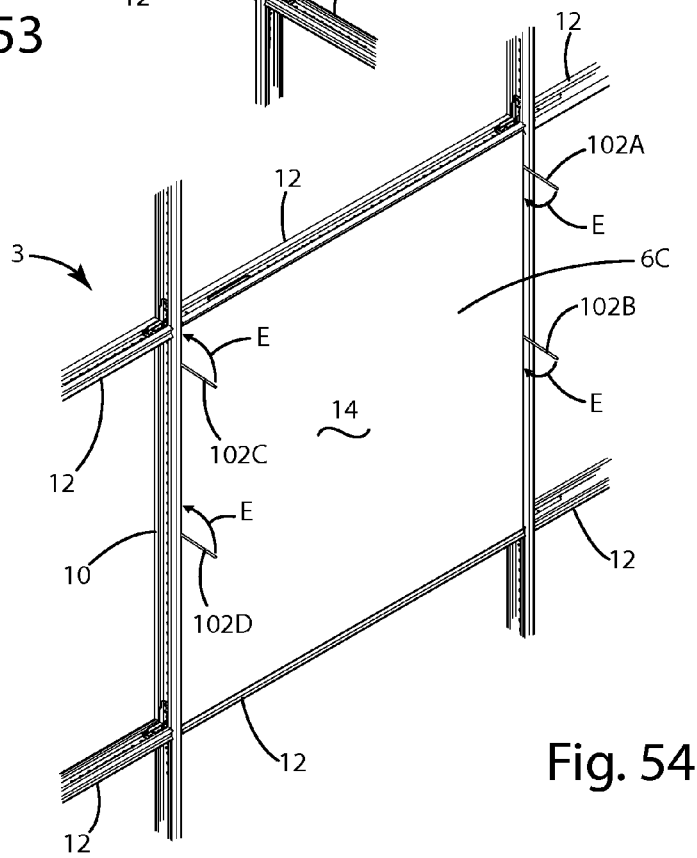
FIG. 54 is a fragmentary perspective view of the panel assembly of FIG. 53 as mounted on the frame assembly.

Referring now to FIGS. 53 and 54, intermediate skin assembly 6C is shown being positioned on the frame assembly 3 using support member 72 to engage upwardly opening channel 44 of horizontal frame member 12. Positioning assemblies 74, 76 are further shown engaging respective vertical frame members 10 to properly position panel assembly 6C laterally on the frame assembly 3. The support member 72 and positioning assembly 74, 76 are coupled to inwardly facing inner surface 16 of the panel assembly 6C. As further shown in FIG. 53, a plurality of latch mechanisms 70A-70E are coupled to the inner surface 16 of panel assembly 6C. The latch mechanisms 70A-70E are used to secure panel assembly 6C to the frame assembly 3 as shown in FIG. 54. Once the panel assembly 6C is engaged with the lower horizontal member 12, the top edge of the panel assembly 6C is rotated towards the frame assembly 3 in a direction as indicated by arrow P in FIG. 52. As shown in FIG. 54, handle portions 102A-102D of the actuator levers of latch mechanisms 70A-70D are visible and disposed outwardly from the outer surface 14 of the panel assembly 6C. In this way, the handle portions 102A-102D of the actuator levers of latch mechanisms 70A-70D function as an indication mechanism to a user that the latch mechanisms 70A-70A are not in a latched position, such that the panel assembly 6C is not properly secured to the frame assembly 3. Handle portions 102A and 102B are moved upward as indicated by arrows E which moves the latch members of latch mechanisms 70A and 70B to the latched position A as described above with reference to FIG. 8. Handle portions 102C and 102D are moved downward in a path as indicated by arrow E to also latch the latch mechanisms 70C, 70D to the horizontal frame member 10.

Figure 56:
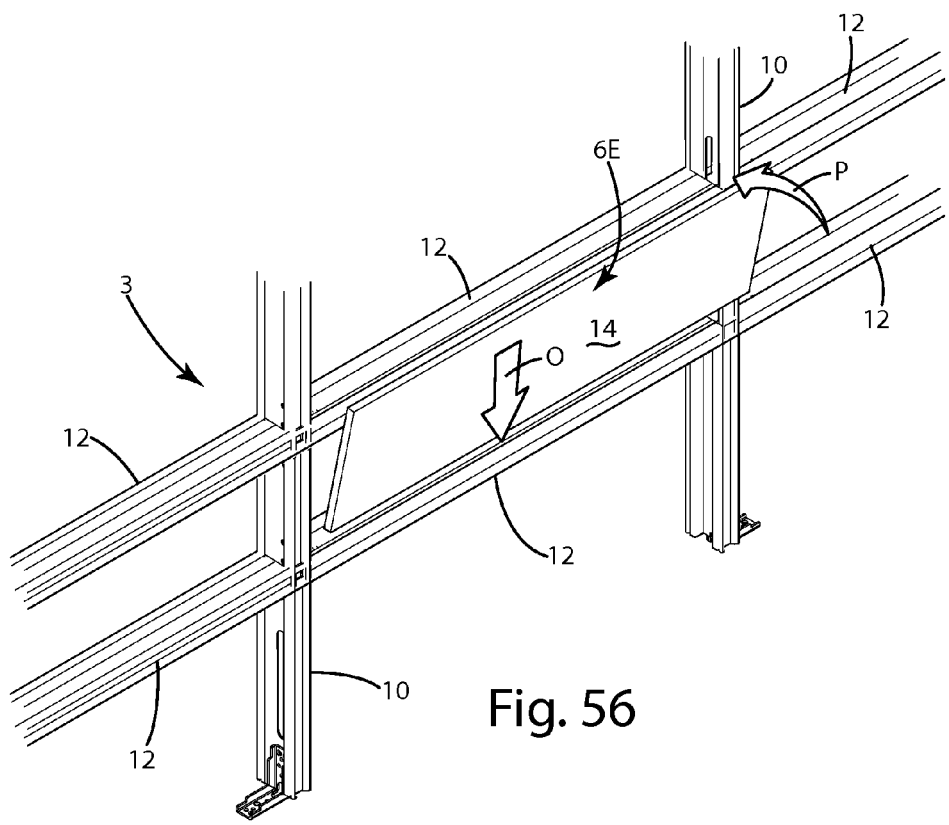
FIG. 56 is a fragmentary perspective view of the panel assembly of FIG. 55 positioned on a frame assembly.

Referring now to FIGS. 55 and 56, an intermediate panel assembly 6E is shown having inner surface 16 with a plurality of latch mechanisms 70 disposed along a top portion thereof. Positioning assemblies 74, 76 are positioned on a bottom portion of the inner surface 16 and a support member 72 is further coupled thereto. Positioning assemblies 250 are further coupled to the inner surface 16 and disposed along a top portion thereof. Thus, as shown in FIG. 56, the support member 72 and positioning assemblies 74, 76 are generally engaged with the frame assembly 3 as the panel assembly 6E moves downward in a direction as indicated by arrow 0. The top portion of the panel assembly 6BE is then rotated towards the frame assembly 3 in a direction as indicated by arrow P, whereby the spring member 262, as shown and described above with reference to FIG. 19B, helps to position the panel assembly 6E in place and ensure engagement of the support member 72 to the horizontal frame member 12. Once properly rotated into place along a direction as indicated by arrow P, the latch mechanisms 70 are actuated to secure the panel assembly 6E to the frame assembly 3.

Figure 57:
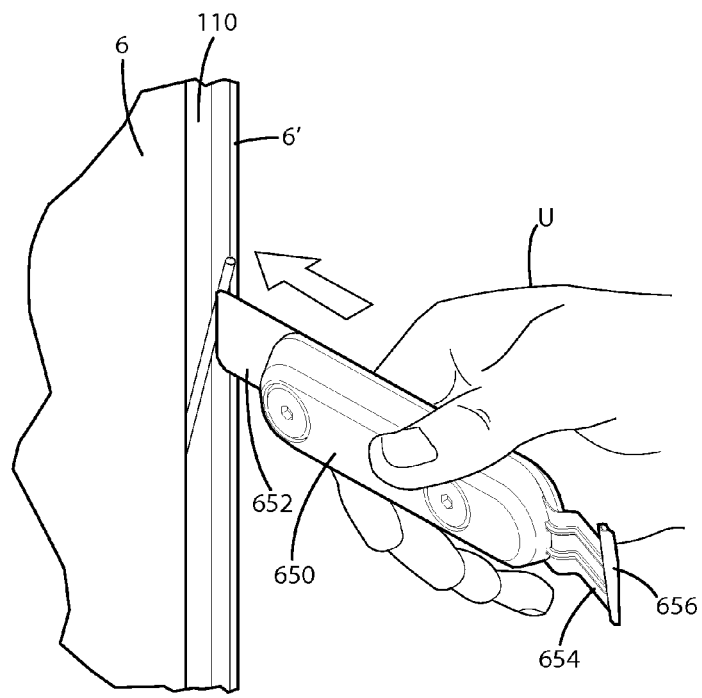
FIG. 57 is a fragmentary perspective view of user engaging an actuator lever.
Figure 58:
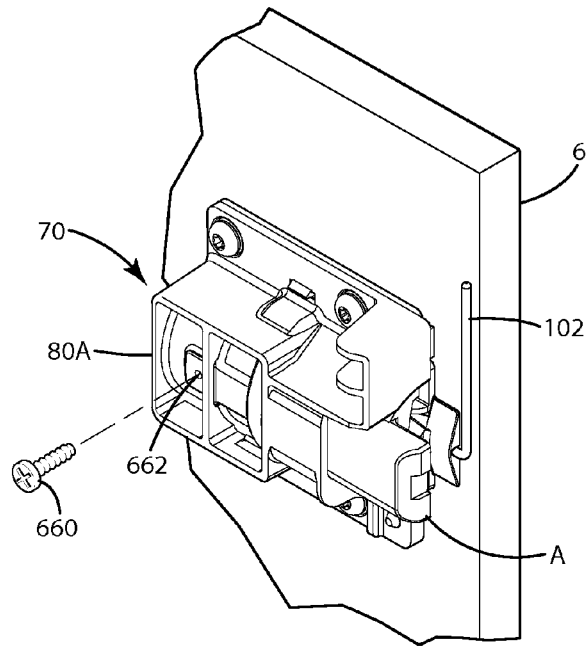
FIG. 58 is a fragmentary perspective view of a latch mechanism as coupled to a panel assembly.

As noted above, and with specific reference to FIG. 13, the handle portions 102 of the latch mechanism 70 are adapted to move to a recessed position C where the handle portions 102 are concealed behind inner surface 16 of a panel assembly as shown in FIG. 58. Thus, in order to retrieve the handle portion 102 of latch mechanism 70 from between the frame assembly and the panel assembly 6, a user U, as shown in FIG. 57, uses a tool 650 having engagement portions 652, 654 which further include cradle portions 656 adapted to engage the handle portion 102 of a latch mechanism 70 when in a latched position. The user U then leverages the tool 650 to overcome the bias of the biasing spring 98, as described above with reference to FIG. 13, to move the actuator level 100 into the gap 110 defined between adjacent panel assemblies 6, 6'. In this way, the user can retrieve handle portion 102 of an actuator lever 100 for releasing a panel assembly 6 from the frame assembly 3. As further shown in FIG. 58, the latch mechanisms 70 may include a locking feature which, as shown in FIG. 58, is in the form of a fastener 660 that is used to engage an aperture 662 disposed on the housing portion 80A of the latch mechanism 70 to retain the latch member 86 in the latched positioned A. In this way, the latch mechanism 70 is locked in a latched position on the frame assembly such that access to the interior of the frame assembly is necessary to release a locked panel assembly 6 from the frame assembly 3.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A panel wall assembly, comprising:
   a frame assembly;
   the frame assembly including at least one panel assembly thereon;
   a trim member operably coupled to the frame assembly of the panel wall assembly, the trim member including a body portion comprising a channel extending along a length thereof and having a first open end and a second open end opposite the first open end, and further comprising a middle portion disposed between the first open end and the second open end;
   wherein the trim member is secured to the frame assembly and extends perpendicular to the at least one panel member;
   a first acoustic seal member disposed within the first open end of the channel;
   a second acoustic seal member disposed within the second open end of the channel;
   wherein the first and second seal members are not disposed within the middle portion of the channel, and wherein the acoustic seals provide an acoustic barrier to noises; and
   wherein the body portion of the trim member is substantially hollow along the channel; the body portion includes oppositely facing inner and outer surfaces disposed along the channel, the inner surface facing the frame assembly, the trim member includes at least one outwardly extending engagement arm disposed on the inner surface that engages the frame assembly, and the at least one outwardly extending engagement arm is disposed inwardly of side edges of the trim member.

2. The panel wall assembly of claim 1, wherein the first seal member is slidably received within the first open end of the trim member and the second seal member is slidably received within the second open end of the trim member.

3. The panel wall assembly of claim 2, wherein the first and second seal members comprise foam seal members adapted to seal the first and second open ends.

4. The panel wall assembly of claim 3, wherein the first and second seal members comprise substantially rigid foam seal members.

5. The panel wall assembly of claim 3, wherein the first and second seal members comprise resiliently flexible foam seal members, and further wherein the first and second seal members are compressible for being received in the first and second open ends, and expandable for sealing the first and second open ends as received therein.

6. A panel wall assembly, comprising:
a frame assembly;
the frame assembly including at least one panel assembly thereon;
a trim member of the panel wall assembly having an elongate body portion including a substantially hollow channel extending along a length of the body portion, the channel having a first end and a second end and a middle portion located between the first end and the second end;
a first acoustical seal member disposed within the first end of the channel, wherein the first acoustical seal is separate from the body portion;
a second acoustical seal member disposed within the second end of the channel, wherein the second acoustical seal is separate from the body portion;
wherein the trim member is secured to the frame assembly and extends perpendicular to the at least one panel member; and
wherein the middle portion of the channel is open between the first and second acoustical seals, and wherein the acoustic seals provide an acoustic barrier to noises;
the body portion includes oppositely facing inner and outer surfaces disposed along the channel, the inner surface facing the frame assembly, the trim member includes at least one outwardly extending engagement arm disposed on the inner surface that engages the frame assembly, and the at least one outwardly extending engagement arm is disposed inwardly of side edges of the trim member.

7. The panel wall assembly of claim 6, wherein the channel comprises a substantially rectangular cross-section.

8. The panel wall assembly of claim 2, wherein the first and second seal members comprise foam seal members adapted to seal the first and second ends of the channel.

9. The panel wall assembly of claim 8, wherein the first and second seal members comprise substantially rigid foam seal members having a cross-section substantially similar to the cross-section of the channel.

10. The panel wall assembly of claim 8, wherein the first and second seal members comprise resiliently flexible foam seal members, and further wherein the first and second seal members are compressible for being received in the first and second ends, and expandable for sealing the first and second ends as received therein.

11. A panel wall assembly, comprising:
a frame assembly of the panel wall assembly including vertical frame members;
a trim member having a body portion configured to cover a vertical side edge of the frame assembly at an end run thereof, the body portion having an outer surface and an inner surface disposed in a laterally spaced apart relationship;
a channel disposed between the outer surface and the inner surface of the trim member, the channel having an upper end and a lower end with a body portion disposed there between;
a first acoustical seal member disposed within and closing the upper end of the channel; and
a second acoustical seal member disposed within and closing the lower end of the channel, wherein the second acoustical seal assembly is spaced apart from the first acoustical seal assembly such that the body portion of the channel is accessible between the outer surface and the inner surface, and wherein the acoustic seals provide an acoustic barrier to noises which may be carried to or originate from the trim member;
wherein in the body portion of the trim member is substantially hollow along the channel; the body portion includes oppositely facing inner and outer surfaces disposed along the channel, the inner surface facing the frame assembly, the trim member includes at least one outwardly extending engagement arm disposed on the inner surface that engages the frame assembly, and the at least one outwardly extending engagement arm is disposed inwardly of side edges of the trim member.

12. The panel wall assembly of claim 11, wherein the body portion of the channel includes an attachment feature adapted to support an accessory for the panel wall system.

13. The panel wall assembly of claim 11, wherein the first and second seal members comprise foam seal members adapted to seal the upper and lower ends of the channel.

14. The panel wall assembly of claim 13, wherein the trim member comprises an angled trim member having first and second portions disposed in a substantially orthogonal relationship.

\* \* \* \* \*